(12) United States Patent
Wenren et al.

(10) Patent No.: US 12,474,546 B2
(45) Date of Patent: Nov. 18, 2025

(54) OPTICAL IMAGING LENS ASSEMBLY

(71) Applicant: ZHEJIANG SUNNY OPTICS CO., LTD., Yuyao Zhejiang (CN)

(72) Inventors: Jianke Wenren, Yuyao Zhejiang (CN); Fujian Dai, Yuyao Zhejiang (CN); Liefeng Zhao, Yuyao Zhejiang (CN)

(73) Assignee: ZHEJIANG SUNNY OPTICS CO., LTD., Yuyao Zhejiang (CN)

( * ) Notice: Subject to any disclaimer, the term of this patent is extended or adjusted under 35 U.S.C. 154(b) by 998 days.

(21) Appl. No.: 17/555,906

(22) Filed: Dec. 20, 2021

(65) Prior Publication Data

US 2022/0236524 A1  Jul. 28, 2022

(30) Foreign Application Priority Data

Jan. 25, 2021 (CN) .......................... 202110097187.1

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
None
See application file for complete search history.

(56) References Cited

U.S. PATENT DOCUMENTS

| | | | |
|---|---|---|---|
| 11,719,913 B2 * | 8/2023 | Lyu | G02B 13/006 359/755 |
| 11,740,434 B2 * | 8/2023 | Liao | G02B 9/64 359/755 |
| 11,774,728 B2 * | 10/2023 | Wang | G02B 9/64 359/755 |
| 2018/0239117 A1 * | 8/2018 | Lee | G02B 27/0025 |
| 2021/0173182 A1 * | 6/2021 | Dai | G02B 9/64 |
| 2021/0173186 A1 * | 6/2021 | Huang | G02B 9/64 |
| 2021/0199933 A1 * | 7/2021 | Wang | G02B 13/18 |

FOREIGN PATENT DOCUMENTS

| | | |
|---|---|---|
| CN | 107065141 A | 8/2017 |
| CN | 107728290 A | 2/2018 |
| TW | 1712830 B | 12/2020 |

OTHER PUBLICATIONS

English translation of Chinese Office Action corresponding to Chinese application No. 202110097187.1 issued Jan. 25, 2022.

\* cited by examiner

*Primary Examiner* — Darryl J Collins
(74) *Attorney, Agent, or Firm* — Norris McLaughlin, PA

(57) ABSTRACT

An optical imaging lens assembly is provided, along an optical axis from an object side to an image side, sequentially includes: a first lens having negative refractive power; a second lens having positive refractive power; a third lens; a fourth lens having positive refractive power; a fifth lens having negative refractive power; a sixth lens having positive refractive power; and a seventh lens. A maximum field-of-view FOV of the optical imaging lens assembly satisfies: tan(FOV/3)≥0.9; and a total effective focal length f of the optical imaging lens assembly, a radius of curvature R9 of an object-side surface of the fifth lens, and a radius of curvature R10 of an image-side surface of the fifth lens satisfy: −3.0<f/R9+f/R10<−1.5.

18 Claims, 12 Drawing Sheets

OPTICAL IMAGING LENS ASSEMBLY

CROSS-REFERENCE TO RELATED APPLICATIONS

This application claims the priority from Chinese Patent Application No. 202110097187.1, filed in the National Intellectual Property Administration (CNIPA) on Jan. 25, 2021, the content of which is hereby incorporated by reference in its entirety.

TECHNICAL FIELD

The present disclosure relates to the field of optical elements, and in particular, to an optical imaging lens assembly.

BACKGROUND

In recent years, portable electronic products having camera functions have gradually emerged. Lens assemblies are used as important parts of camera systems, and the imaging quality of lens assemblies has also received more and more attention.

With the rapid development of camera systems for portable electronic products, higher requirements have been put forward on optical imaging lens assemblies. In order to provide users with high-quality camera functions in an all-round way, large field-of-view optical imaging lens assemblies having better resolutions and more satisfactory imaging effects have become a trend in lens assembly development. A wide-angle lens assembly has the characteristics of large field-of-view and long depth of field, which can easily bring a sense of perspective to a photographer, and is beneficial to enhance the appeal of pictures.

SUMMARY

The present disclosure provides an optical imaging lens assembly, along an optical axis from an object side to an image side sequentially includes: a first lens having negative refractive power; a second lens having positive refractive power; a third lens; a fourth lens having positive refractive power; a fifth lens having negative refractive power; a sixth lens having positive refractive power and a seventh lens. A maximum field-of-view FOV of the optical imaging lens assembly satisfies: $\tan(FOV/3) \geq 0.9$; and a total effective focal length f of the optical imaging lens assembly, a radius of curvature R9 of an object-side surface of the fifth lens, and a radius of curvature R10 of an image-side surface of the fifth lens satisfy: $-3.0 < f/R9 + f/R10 < -1.5$.

In an implementation, the total effective focal length f of the optical imaging lens assembly, a radius of curvature R5 of an object-side surface of the third lens, and a radius of curvature R6 of an image-side surface of the third lens satisfy: $-2.0 < f/R5 + f/R6 \leq -1.4$.

In an implementation, the total effective focal length f of the optical imaging lens assembly and an effective focal length f7 of the seventh lens satisfy: $-0.1 < f/f7 < 0.5$.

In an implementation, an effective focal length f2 of the second lens and an effective focal length f4 of the fourth lens satisfy: $3.5 < f2/f4 < 4.0$.

In an implementation, an effective focal length f6 of the sixth lens and an effective focal length f4 of the fourth lens satisfy: $2.0 < f6/f4 < 4.0$.

In an implementation, an effective focal length f1 of the first lens and a spaced interval T12 between the first lens and the second lens on the optical axis satisfy: $-3.0 < f1/T12 < -2.0$.

In an implementation, a spaced interval T56 between the fifth lens and the sixth lens on the optical axis and a spaced interval T67 between the sixth lens and the seventh lens on the optical axis satisfy: $1.5 < T56/T67 < 2.0$.

In an implementation, a radius of curvature R1 of an object-side surface of the first lens and a radius of curvature R2 of an image-side surface of the first lens satisfy: $4.0 < R1/R2 < 5.0$.

In an implementation, a radius of curvature R4 of an image-side surface of the second lens and a radius of curvature R3 of an object-side surface of the second lens satisfy: $0 < |R3+R4|/(R3-R4) < 0.3$.

In an implementation, a radius of curvature R7 of an object-side surface of the fourth lens, a radius of curvature R8 of an image-side surface of the fourth lens, and a center thickness CT4 of the fourth lens on the optical axis satisfy: $0.9 < (R7+R8)/CT4 < 2.0$.

In an implementation, the total effective focal length f of the optical imaging lens assembly and an effective focal length f3 of the third lens satisfy: $f/|f3| < 0.1$.

In an implementation, an effective focal length f5 of the fifth lens and a combined focal length f45 of the fourth lens and the fifth lens satisfy: $-1.2 f5/f45 < -0.5$.

In an implementation, the optical imaging lens assembly further comprises a diaphragm, and a maximum effective radius DT11 of the object-side surface of the first lens and a maximum effective radius DTs of the diaphragm satisfy: $3.0 < DT11/DTs < 4.5$.

In an implementation, the optical imaging lens assembly further comprises a diaphragm, and a maximum effective radius DTs of the diaphragm and half of a diagonal length ImgH of an effective pixel area on an imaging plane of the optical imaging lens assembly satisfy: $0 < DTs/ImgH \leq 0.2$.

According to another aspect, the present disclosure provides an optical imaging lens assembly, along an optical axis from an object side to an image side sequentially includes: a first lens having negative refractive power; a second lens having positive refractive power; a third lens; a fourth lens having positive refractive power; a fifth lens having negative refractive power; a sixth lens having positive refractive power; and a seventh lens; wherein, a maximum field-of-view FOV of the optical imaging lens assembly satisfies: $\tan(FOV/3) \geq 0.9$; and an effective focal length f1 of the first lens and a spaced interval T12 between the first lens and the second lens on the optical axis satisfy: $-3.0 < f1/T12 < -2.0$.

In an implementation, a total effective focal length f of the optical imaging lens assembly, a radius of curvature R5 of an object-side surface of the third lens, and a radius of curvature R6 of an image-side surface of the third lens satisfy: $-2.0 < f/R5 + f/R6 \leq 1.4$.

In an implementation, a total effective focal length f of the optical imaging lens assembly and an effective focal length f7 of the seventh lens satisfy: $-0.1 < f/f7 < 0.5$.

In an implementation, an effective focal length f2 of the second lens and an effective focal length f4 of the fourth lens satisfy: $3.5 < f2/f4 < 4.0$.

In an implementation, an effective focal length f6 of the sixth lens and an effective focal length f4 of the fourth lens satisfy: $2.0 < f6/f4 < 4.0$.

In an implementation, a spaced interval T56 between the fifth lens and the sixth lens on the optical axis and a spaced interval T67 between the sixth lens and the seventh lens on the optical axis satisfy: $1.5 < T56/T67 < 2.0$.

In an implementation, a radius of curvature R1 of an object-side surface of the first lens and a radius of curvature R2 of an image-side surface of the first lens satisfy: $4.0<R1/R2<5.0$.

In an implementation, a radius of curvature R4 of an image-side surface of the second lens and a radius of curvature R3 of an object-side surface of the second lens satisfy: $0<|R3+R4|/(R3-R4)<0.3$.

In an implementation, a radius of curvature R7 of an object-side surface of the fourth lens, a radius of curvature R8 of an image-side surface of the fourth lens, and a center thickness CT4 of the fourth lens on the optical axis satisfy: $0.9<(R7+R8)/CT4<2.0$.

In an implementation, a total effective focal length f of the optical imaging lens assembly and an effective focal length f3 of the third lens satisfy: $f/|f3|<0.1$.

In an implementation, an effective focal length f5 of the fifth lens and a combined focal length f45 of the fourth lens and the fifth lens satisfy: $-1.2 \leq f5/f45 < -0.5$.

In an implementation, the optical imaging lens assembly further comprises a diaphragm, and a maximum effective radius DT11 of the object-side surface of the first lens and a maximum effective radius DTs of the diaphragm satisfy: $3.0<DT11/DTs<4.5$.

In an implementation, the optical imaging lens assembly further comprises a diaphragm, and a maximum effective radius DTs of the diaphragm and half of a diagonal length ImgH of an effective pixel area on an imaging plane of the optical imaging lens assembly satisfy: $0<DTs/ImgH \leq 0.2$.

The present disclosure adopts a seven-lens lens assembly architecture. By reasonably distributing the refractive power of each lens, the surface shape, the center thickness of each lens, and axial spaced intervals between the lenses, the optical imaging lens assembly has at least one beneficial effect such as a large field-of-view, high imaging quality, and high resolution.

BRIEF DESCRIPTION OF THE DRAWINGS

By reading detailed description of non-limiting embodiments with reference to the following accompanying drawings, other features, objectives and advantages of the present disclosure will be more apparent. In the accompanying drawings.

DETAILED DESCRIPTION OF EMBODIMENTS

Figure 1:
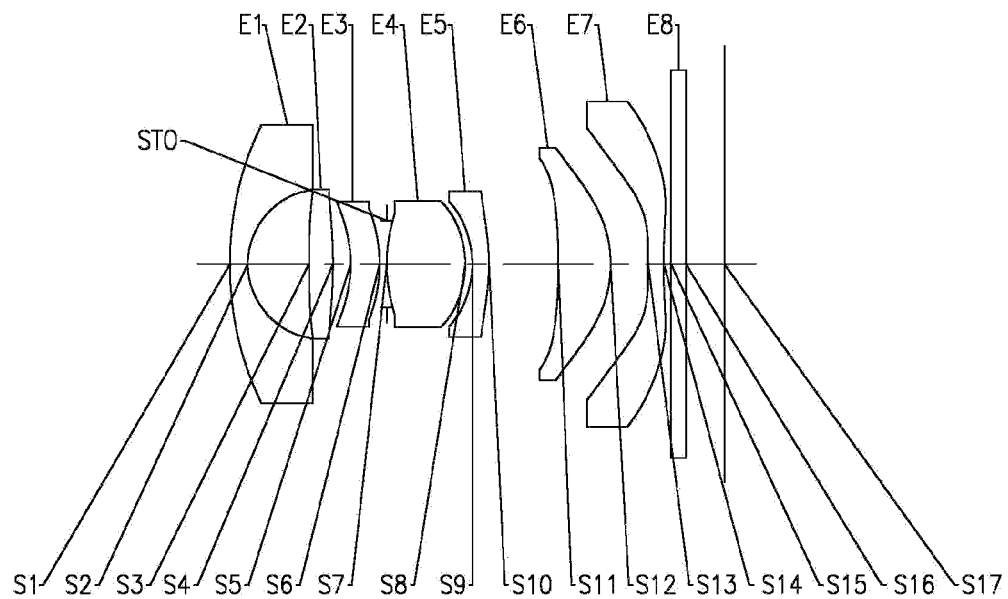
FIG. 1 is a schematic structural diagram illustrating an optical imaging lens assembly according to Example 1 of the present disclosure.

For a better understanding of the present disclosure, various aspects of the present disclosure will be described in more detail with reference to the accompanying drawings. It should be understood that the detailed description is merely an illustration for the exemplary embodiments of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as an object-side surface, and the surface closest to the imaging plane in each lens is referred to as an image-side surface.

It should be further understood that the terms "comprising," "including," "having", "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The features, principles, and other aspects of the present disclosure are described in detail below.

The optical imaging lens assembly according to exemplary embodiments of the present disclosure may include, for example, seven lenses having refractive power, namely, a first lens, a second lens, a third lens, a fourth lens, a fifth lens, a sixth lens and a seventh lens. The seven lenses are arranged in sequence from an object side to an image side along an optical axis. In the first lens to the seventh lens, there may be an air interval between any two adjacent lenses.

In an exemplary embodiment, the first lens may have negative refractive power; the second lens may have positive refractive power; the third lens may have positive refractive power or negative refractive power; the fourth lens may have positive refractive power; the fifth lens may have negative refractive power; the sixth lens may have positive refractive power; the seventh lens may have positive refractive power or negative refractive power. By reasonably distributing the positive and negative refractive power of each lens of the optical imaging lens assembly, the imaging quality of the optical imaging lens assembly may be effectively improved.

In an exemplary embodiment, the optical imaging lens assembly according to the present disclosure may satisfy: $\tan(FOV/3) \geq 0.9$, where FOV is a maximum field-of-view of the optical imaging lens assembly. The optical imaging lens assembly satisfies: $\tan(FOV/3) \geq 0.9$, which may make the optical imaging lens assembly have the characteristic of a large field-of-view. More specifically, FOV may satisfy: $\tan(FOV/3) \geq 0.95$.

In an exemplary embodiment, the optical imaging lens assembly according to the present disclosure may satisfy: $-3.0 < f/R9 + f/R10 < -1.5$, where f is a total effective focal length of the optical imaging lens assembly, R9 is a radius of curvature of an object-side surface of the fifth lens, and R10 is a radius of curvature of an image-side surface of the fifth lens. The optical imaging lens assembly satisfies: $-3.0 < f/R9 + f/R10 < -1.5$, which may control the spherical aberration contribution of the fifth lens within a reasonable range, so that the optical imaging lens assembly has a high axial imaging resolution ability. More specifically, f, R9 and R10 may satisfy: $-2.5 \leq f/R9 + f/R10 \leq -1.6$.

In an exemplary embodiment, the optical imaging lens assembly according to the present disclosure may satisfy: $-2.0 < f/R5 + f/R6 \leq -1.4$, where f is the total effective focal length of the optical imaging lens assembly, R5 is a radius of curvature of an object-side surface of the third lens, and R6 is a radius of curvature of an image-side surface of the third lens. The optical imaging lens assembly satisfies: $-2.0 < f/R5 + f/R6 \leq -1.4$, which can reduce the exit angle of a light path after passing through the third lens, thereby effectively reducing the sensitivity of the third lens to the optical imaging lens assembly.

In an exemplary embodiment, the optical imaging lens assembly according to the present disclosure may satisfy: $-0.1 < f/f7 < 0.5$, where f is the total effective focal length of the optical imaging lens assembly, and f7 is an effective focal length of the seventh lens. The optical imaging lens assembly satisfies: $-0.1 < f/f7 < 0.5$, which may make the contribution of the thickness of the seventh lens to a field curvature within a reasonable range.

In an exemplary embodiment, the optical imaging lens assembly according to the present disclosure may satisfy: $3.5 < f2/f4 < 4.0$, where f2 is an effective focal length of the second lens, and f4 is an effective focal length of the fourth lens. The optical imaging lens assembly satisfies: $3.5 < f2/f4 < 4.0$, which may effectively reduce the decentering sensitivities of the second lens and the fourth lens, thereby improving the assembly yield of the optical imaging lens assembly.

In an exemplary embodiment, the optical imaging lens assembly according to the present disclosure may satisfy: $2.0 < f6/f4 < 4.0$, where f6 is an effective focal length of the sixth lens, and f4 is an effective focal length of the fourth lens. The optical imaging lens assembly satisfies: $2.0 < f6/f4 < 4.0$, which may effectively reduce the decentering sensitivity of the sixth lens relative to the fourth lens, thereby improving the assembly yield of the optical imaging lens assembly. More specifically, f6 and f4 may satisfy: $2.4 \leq f6/f4 \leq 3.8$.

In an exemplary embodiment, the optical imaging lens assembly according to the present disclosure may satisfy: $-3.0 < f1/T12 < -2.0$, where f1 is an effective focal length of the first lens, and T12 is a spaced interval between the first lens and the second lens on the optical axis. The optical imaging lens assembly satisfies: $-3.0 < f1/T12 < -2.0$, which can reasonably control a space ratio of the first lens and the second lens, which is beneficial to ensure the assembly process of the lenses, and at the same time is beneficial to realize the miniaturization of the optical imaging lens assembly.

In an exemplary embodiment, the optical imaging lens assembly according to the present disclosure may satisfy: $1.5 < T56/T67 < 2.0$, where T56 is a spaced interval between the fifth lens and the sixth lens on the optical axis, and T67 is a spaced interval between the sixth lens and the seventh lens on the optical axis. The optical imaging lens assembly satisfies: $1.5 < T56/T67 < 2.0$, which is conducive to the processing and molding process of the fifth lens and the sixth lens, so that the optical imaging lens assembly has better processability, and at the same time is conducive to the miniaturization of the optical imaging lens assembly.

In an exemplary embodiment, the optical imaging lens assembly according to the present disclosure may satisfy: 4.0<R1/R2<5.0, where R1 is a radius of curvature of an object-side surface of the first lens, and R2 is a radius of curvature of an image-side surface of the first lens. The optical imaging lens assembly satisfies: 4.0<R1/R2<5.0, which is beneficial for the optical imaging lens assembly to have a large field-of-view. More specifically, R1 and R2 may satisfy: 4.5≤R1/R2<5.0.

In an exemplary embodiment, the optical imaging lens assembly according to the present disclosure may satisfy: 0<|R3+R4|/(R3−R4)<0.3, where R4 is a radius of curvature of an image-side surface of the second lens, and R3 is a radius of curvature of an object-side surface of the second lens. The optical imaging lens assembly satisfies: 0<|R3+R4|/(R3−R4)<0.3, which can reasonably control an axial chromatic aberration and spherical aberration of the optical imaging lens assembly.

In an exemplary embodiment, the optical imaging lens assembly according to the present disclosure may satisfy: 0.9<(R7+R8)/CT4<2.0, where R7 is a radius of curvature of an object-side surface of the fourth lens, R8 is a radius of curvature of an image-side surface of the fourth lens, and CT4 is a center thickness of the fourth lens on the optical axis. The optical imaging lens assembly satisfies: 0.9<(R7+R8)/CT4<2.0, which may reduce the sensitivity of the optical imaging lens assembly, avoid excessive tolerance requirements, and at the same time can reasonably control the chromatic aberration contribution of the fourth lens, which is beneficial to reduce the axial chromatic aberration of the optical imaging lens assembly. More specifically, R7, R8, and CT4 may satisfy: 0.9<(R7+R8)/CT4≤1.8.

In an exemplary embodiment, the optical imaging lens assembly according to the present disclosure may satisfy: f/|f3|<0.1, where f is the total effective focal length of the optical imaging lens assembly, and f3 is an effective focal length of the third lens. The optical imaging lens assembly satisfies: f/|f3|<0.1, which is beneficial to increase the maximum field-of-view of the optical imaging lens assembly, and at the same time, is beneficial to reduce the decentering sensitivity of the third lens.

In an exemplary embodiment, the optical imaging lens assembly according to the present disclosure may satisfy: −1.2≤f5/f45<−0.5, where f5 is an effective focal length of the fifth lens, and f45 is a combined focal length of the fourth lens and the fifth lens. The optical imaging lens assembly satisfies: −1.2f5/f45<−0.5, which is conducive to better match the CRA (Chief Ray Angle) of a photosensitive chip when the light from each field-of-view of the optical imaging lens assembly reaches the imaging plane, so as to ensure the imaging quality of the optical imaging lens assembly.

In an exemplary embodiment, the optical imaging lens assembly according to the present disclosure may further include a diaphragm. The diaphragm may be set at an appropriate position as required, for example, between the third lens and the fourth lens. The optical imaging lens assembly may satisfy: 3.0<DT11/DTs<4.5, where DT11 is a maximum effective radius of the object-side surface of the first lens, and DTs is a maximum effective radius of the diaphragm. The optical imaging lens assembly satisfies: 3.0<DT11/DTs<4.5, which is conducive to the miniaturization of the optical imaging lens assembly, and at the same time, may reduce the distortion of the optical imaging lens assembly.

In an exemplary embodiment, the optical imaging lens assembly according to the present disclosure may satisfy: 0<DTs/ImgH≤0.2, where DTs is a maximum effective radius of the diaphragm, and ImgH is half of a diagonal length of an effective pixel area on an imaging plane of the optical imaging lens assembly. The optical imaging lens assembly satisfies: 0<DTs/ImgH≤0.2, which may make the optical imaging lens assembly have a large aperture, which is beneficial to improve the shooting ability of the optical imaging lens assembly in a dark environment. More specifically, DTs and ImgH may satisfy: 0.1≤DTs/ImgH≤0.2.

In an exemplary embodiment, the above optical imaging lens assembly may further include an optical filter for correcting the color deviation and/or a cover glass for protecting the photosensitive element located on the imaging plane.

The optical imaging lens assembly according to the above embodiments of the present disclosure may use a plurality of lenses, such as the above seven lenses. By reasonably distributing the refractive power of each lens, the surface shape, the center thickness of each lens, and axial spaced intervals between the lenses, etc., it may effectively reduce the size of the optical imaging lens assembly, reduce the sensitivity of the optical imaging lens assembly, and improve the processability of the camera lens group, making the optical imaging lens assembly more conducive to production and processing and suitable for portable electronic products. The optical imaging lens assembly according to the embodiments of the present disclosure may have an ultra-wide angle with improved distortion and lateral chromatic aberration.

In the embodiments of the present disclosure, at least one of the surfaces of the lenses is an aspheric surface, that is, at least one of the surfaces from the object-side surface of the first lens to the image-side surface of the seventh lens is an aspheric surface. The characteristic of the aspheric lens is: the curvature is continuously changing from the center of the lens to the periphery of the lens. Unlike the spherical lens with a constant curvature from the center of the lens to the periphery, the aspheric lens has a better radius of curvature characteristic, having advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens and the seventh lens is an aspheric surface. Alternatively, the object-side surface and the image-side surface of each of the first lens, the second lens, the third lens, the fourth lens, the fifth lens, the sixth lens and the seventh lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having seven lenses is described as an example in the embodiments, the optical imaging lens assembly is not limited to include seven lenses. If desired, the optical imaging lens assembly may also include other numbers of lenses.

Specific examples of the optical imaging lens assembly that may be applied to the above embodiments are further described below with reference to the accompanying drawings.

Example 1

An optical imaging lens assembly according to Example 1 of the present disclosure is described below with reference to FIGS. 1-2C. FIG. 1 is a schematic structural diagram illustrating the optical imaging lens assembly according to Example 1 of the present disclosure.

As shown in FIG. 1, the optical imaging lens assembly along an optical axis from an object side to an image side sequentially includes: a first lens E1, a second lens E2, a third lens E3, a diaphragm STO, a fourth lens E4, a fifth lens E5, a sixth lens E6, a seventh lens E7 and an optical filter E8.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has negative refractive power, an object-side surface S5 of the third lens is a concave surface, and an image-side surface S6 of the third lens is a convex surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a convex surface. The sixth lens E6 has positive refractive power, an object-side surface S11 of the sixth lens is a concave surface, and an image-side surface S12 of the sixth lens is a convex surface. The seventh lens E7 has positive refractive power, an object-side surface S13 of the seventh lens is a convex surface, and an image-side surface S14 of the seventh lens is a concave surface. The optical filter E8 has an object-side surface S15 and an image-side surface S16. The optical imaging lens assembly has an imaging plane S17. Light from an object sequentially passes through the respective surfaces S1 to S16 and is finally imaged on the imaging plane S17.

Table 1 is a table illustrating basic parameters of the optical imaging lens assembly of Example 1, where the units for the radius of curvature, the thickness and the focal length are millimeter (mm).

TABLE 1

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| S1 | Aspheric | 4.9457 | 0.2494 | 1.546 | 56.09 | −2.37 | 0.000 |
| S2 | Aspheric | 1.0064 | 0.8571 | | | | −1.000 |
| S3 | Aspheric | 10.7205 | 0.3386 | 1.677 | 19.24 | 6.11 | 0.000 |
| S4 | Aspheric | −6.6567 | 0.2483 | | | | 0.000 |
| S5 | Aspheric | −1.7851 | 0.4053 | 1.546 | 56.09 | −104.48 | 0.000 |
| S6 | Aspheric | −1.9906 | 0.1000 | | | | 0.000 |
| STO | Spherical | Infinite | 0.0000 | | | | |
| S7 | Aspheric | 2.3002 | 1.1005 | 1.546 | 56.09 | 1.67 | 0.000 |
| S8 | Aspheric | −1.2492 | 0.1000 | | | | 0.000 |
| S9 | Aspheric | −1.1520 | 0.2327 | 1.677 | 19.24 | −3.39 | 0.000 |
| S10 | Aspheric | −2.5045 | 0.9705 | | | | 0.000 |
| S11 | Aspheric | −18.8195 | 0.7332 | 1.546 | 56.09 | 4.22 | 0.000 |
| S12 | Aspheric | −2.0829 | 0.5279 | | | | 0.000 |
| S13 | Aspheric | 50.8002 | 0.2200 | 1.537 | 55.71 | 102.46 | 0.000 |
| S14 | Aspheric | 668.1763 | 0.1000 | | | | 0.000 |
| S15 | Spherical | Infinite | 0.2100 | 1.518 | 64.17 | | |
| S16 | Spherical | Infinite | 0.5380 | | | | |
| S17 | Spherical | Infinite | | | | | |

In this example, the total effective focal length f of the optical imaging lens assembly is 1.66 mm, and the maximum field-of-view FOV is 134.6°.

In Example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to each aspheric surface S1 to S14 in Example 1.

TABLE 2

| Surface number | A4 | A6 | A8 | A10 | A12 | A14 | A16 |
|---|---|---|---|---|---|---|---|
| S1 | 4.3093E−02 | −3.7039E−03 | 3.3745E−04 | −2.0885E−05 | 9.4653E−07 | −2.7981E−08 | 0.0000E+00 |
| S2 | 2.3961E−01 | 6.8408E−02 | 2.5001E−02 | 1.3111E−02 | 7.0604E−03 | 4.1840E−03 | 2.5398E−03 |
| S3 | 7.1045E−03 | 2.4146E−03 | −1.0292E−03 | 3.1459E−04 | −1.3913E−04 | 3.5551E−05 | 1.4456E−05 |
| S4 | 1.4926E−02 | −1.1412E−03 | −1.4169E−04 | 2.0052E−04 | −1.3376E−04 | 3.4329E−05 | 4.6675E−06 |
| S5 | 3.4127E−02 | −2.0030E−03 | 4.5455E−04 | −2.1864E−04 | 2.0943E−05 | 3.6028E−05 | −8.1565E−06 |
| S6 | 1.3895E−02 | −1.8808E−03 | 3.7341E−04 | −2.1588E−04 | 7.6758E−05 | −2.5997E−06 | 2.4879E−06 |
| S7 | 1.2901E−03 | −1.0781E−03 | −4.7033E−05 | 7.9180E−06 | −3.0003E−05 | 2.4470E−05 | −1.7140E−05 |
| S8 | 3.4508E−02 | −1.2311E−02 | 2.8403E−03 | 5.1704E−06 | 1.3632E−04 | −1.0589E−04 | −5.0222E−06 |
| S9 | 9.4755E−02 | −1.8583E−02 | 6.6063E−03 | 2.2127E−04 | 3.2404E−04 | −9.8570E−05 | −4.5782E−05 |
| S10 | 1.1488E−01 | −1.3792E−02 | 5.0822E−03 | −5.3986E−04 | 1.6385E−04 | −2.2702E−05 | −1.6441E−05 |
| S11 | −2.0710E−01 | −2.6933E−03 | −9.8657E−03 | 3.9937E−03 | −1.8773E−03 | 8.4271E−04 | −4.2514E−04 |
| S12 | −6.5154E−02 | 9.9528E−02 | −2.1531E−02 | 1.2697E−02 | −4.2761E−03 | 1.3578E−03 | −9.5635E−04 |
| S13 | −1.1367E+00 | 3.1889E−01 | −8.6250E−02 | 1.7720E−02 | −1.8561E−03 | 3.7208E−04 | −9.6561E−04 |
| S14 | −5.2979E−01 | 4.8654E−03 | 3.3703E−02 | −3.5239E−02 | 2.2041E−02 | −1.1126E−02 | 5.0389E−03 |

| Surface number | A18 | A20 | A22 | A24 | A26 | A28 | A30 |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | 1.5728E−03 | 9.8018E−04 | 6.0681E−04 | 3.6872E−04 | 2.1467E−04 | 1.1823E−04 | 4.8671E−05 |
| S3 | 3.8716E−06 | −9.8825E−06 | 2.7592E−06 | −1.5271E−07 | 0.0000E+00 | 0.0000E+00 | 0.0000E+00 |
| S4 | −6.0081E−06 | 1.6007E−06 | −1.3621E−07 | 0.0000E+00 | 0.0000E+00 | 0.0000E+00 | 0.0000E+00 |
| S5 | −1.9893E−06 | 1.9238E−07 | 8.6237E−08 | 0.0000E+00 | 0.0000E+00 | 0.0000E+00 | 0.0000E+00 |
| S6 | −9.4376E−06 | 9.4830E−06 | −5.3847E−06 | 1.4825E−06 | −1.4055E−07 | 0.0000E+00 | 0.0000E+00 |
| S7 | 1.7062E−05 | −9.2277E−06 | 7.1996E−06 | −2.8940E−06 | 0.0000E+00 | 0.0000E+00 | 0.0000E+00 |
| S8 | 2.4816E−05 | 3.3216E−06 | −5.4487E−06 | 1.3431E−06 | 0.0000E+00 | 0.0000E+00 | 0.0000E+00 |
| S9 | 3.5816E−05 | 5.3664E−06 | −1.2651E−05 | −5.0621E−06 | 0.0000E+00 | 0.0000E+00 | 0.0000E+00 |
| S10 | 1.8029E−05 | 3.2494E−06 | −6.2627E−06 | −1.2307E−06 | 0.0000E+00 | 0.0000E+00 | 0.0000E+00 |
| S11 | 3.1618E−04 | −1.0240E−04 | 3.7911E−05 | −4.3402E−05 | −7.5413E−07 | 0.0000E+00 | 0.0000E+00 |
| S12 | 2.6571E−04 | 1.9936E−05 | −1.3993E−05 | 0.0000E+00 | 0.0000E+00 | 0.0000E+00 | 0.0000E+00 |
| S13 | 1.0644E−03 | −7.9970E−04 | 1.6987E−04 | −6.7512E−05 | −6.4549E−06 | −8.7956E−07 | 0.0000E+00 |
| S14 | −1.6468E−03 | 3.0781E−04 | −2.5965E−05 | 4.5413E−07 | 0.0000E+00 | 0.0000E+00 | 0.0000E+00 |

Figure 2A:
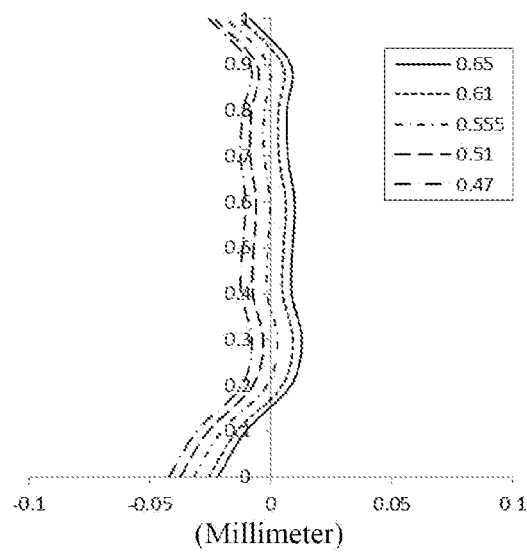
FIGS. 2A-2C respectively illustrate a longitudinal aberration curve, an astigmatic curve and a distortion curve of the optical imaging lens assembly according to Example 1.
Figure 2B:
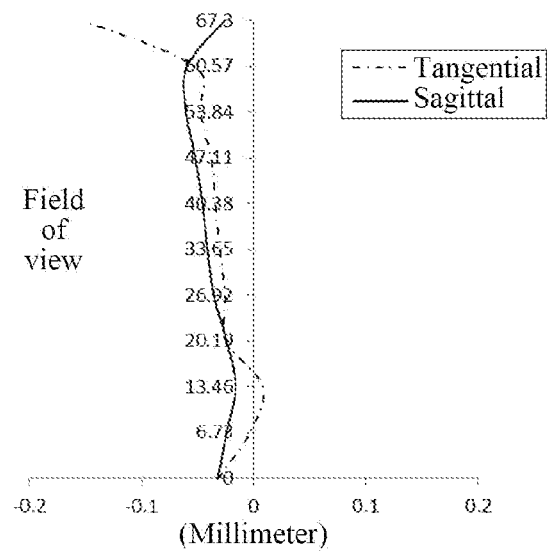
Figure 2C:
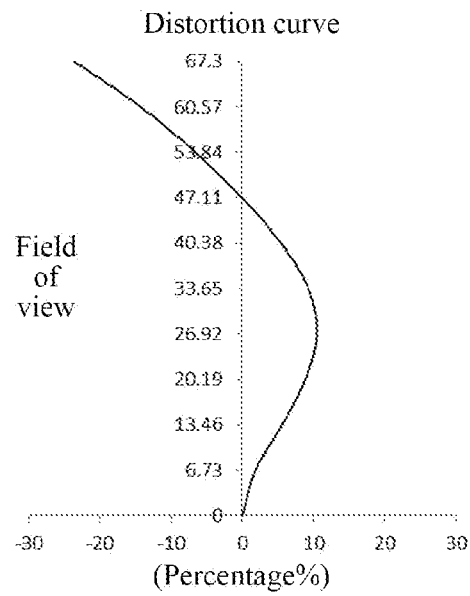

FIG. 2A illustrates the longitudinal aberration curve of the optical imaging lens assembly according to Example 1, representing deviations of focal points converged by light of different wavelengths after passing through the lens assembly. FIG. 2B illustrates the astigmatic curve of the optical imaging lens assembly according to Example 1, representing a curvature of a tangential plane and a curvature of a sagittal plane. FIG. 2C illustrates the distortion curve of the optical imaging lens assembly according to Example 1, representing the amounts of distortion corresponding to different field-of-views. It can be seen from FIG. 2A to FIG. 2C that the optical imaging lens assembly provided in Example 1 can achieve good imaging quality.

Example 2

Figure 3:
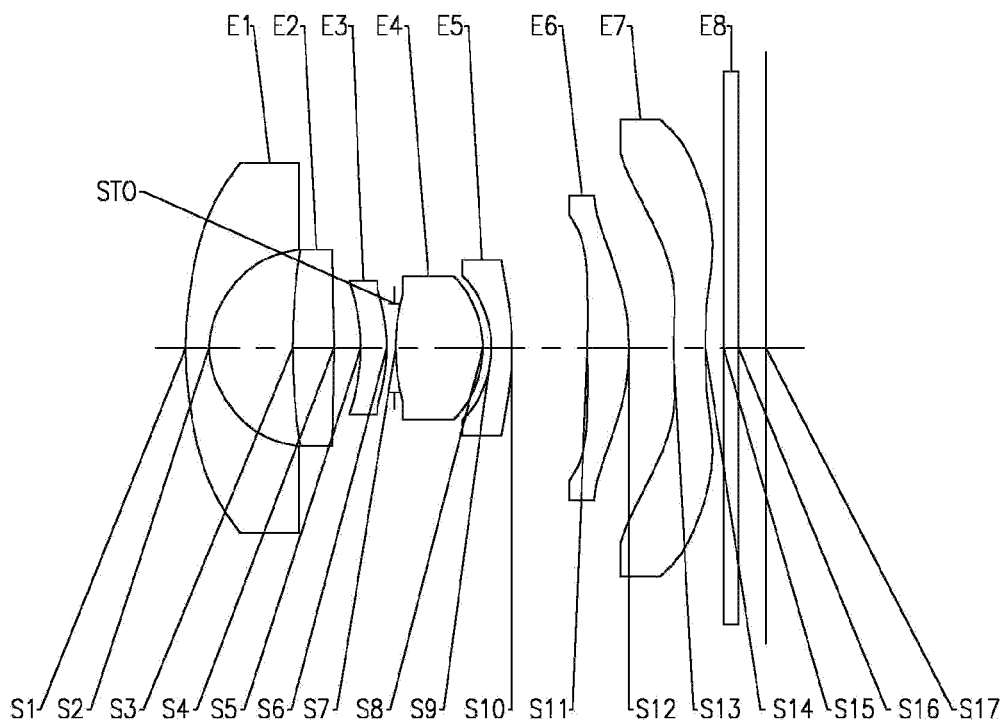
FIG. 3 is a schematic structural diagram illustrating an optical imaging lens assembly according to Example 2 of the present disclosure.

An optical imaging lens assembly according to Example 2 of the present disclosure is described below with reference to FIG. 3 to FIG. 4C. In this example and the following examples, for the purpose of brevity, the description of parts similar to those in Example 1 will be omitted. FIG. 3 illustrates a schematic structural diagram of the optical imaging lens assembly according to Example 2 of the present disclosure.

As shown in FIG. 3, the optical imaging lens assembly along an optical axis from an object side to an image side sequentially includes: a first lens E1, a second lens E2, a third lens E3, a diaphragm STO, a fourth lens E4, a fifth lens E5, a sixth lens E6, a seventh lens E7 and an optical filter E8.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has positive refractive power, an object-side surface S5 of the third lens is a concave surface, and an image-side surface S6 of the third lens is a convex surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a convex surface. The sixth lens E6 has positive refractive power, an object-side surface S11 of the sixth lens is a convex surface, and an image-side surface S12 of the sixth lens is a convex surface. The seventh lens E7 has positive refractive power, an object-side surface S13 of the seventh lens is a convex surface, and an image-side surface S14 of the seventh lens is a concave surface. The optical filter E8 has an object-side surface S15 and an image-side surface S16. The optical imaging lens assembly has an imaging plane S17. Light from an object sequentially passes through the respective surfaces S1 to S16 and is finally imaged on the imaging plane S17.

In Example 2, the total effective focal length f of the optical imaging lens assembly is 1.68 mm, and the maximum field-of-view FOV is 132.6°.

Table 3 is a table illustrating basic parameters of the optical imaging lens assembly of Example 2, where the units for the radius of curvature, the thickness and the focal length are millimeter (mm). Table 4 shows high-order coefficients applicable to each aspheric surface in Example 2, where the surface shape of each aspheric surface may be defined by the formula (1) given in the above Example 1.

different wavelengths after passing through the lens assembly. FIG. 4B illustrates the astigmatic curve of the optical imaging lens assembly according to Example 2, representing a curvature of a tangential plane and a curvature of a sagittal plane. FIG. 4C illustrates the distortion curve of the optical imaging lens assembly according to Example 2, representing the amounts of distortion corresponding to different field-

TABLE 3

| Surface number | Surface type | Radius of curvature | Thickness | Material Refractive index | Material Abbe number | Focal length | Conic coefficient |
|---|---|---|---|---|---|---|---|
| OBJ | Spherical | Infinite | Infinite | | | | |
| S1 | Aspheric | 4.9889 | 0.3292 | 1.546 | 55.97 | −2.63 | 0.000 |
| S2 | Aspheric | 1.0896 | 1.1722 | | | | −1.000 |
| S3 | Aspheric | 7.5727 | 0.5790 | 1.666 | 20.32 | 6.93 | |
| S4 | Aspheric | −11.4563 | 0.3777 | | | | 0.000 |
| S5 | Aspheric | −2.3009 | 0.3617 | 1.546 | 55.97 | 29.89 | 0.000 |
| S6 | Aspheric | −2.1284 | 0.1092 | | | | 0.000 |
| STO | Spherical | Infinite | 0.0177 | | | | 0.000 |
| S7 | Aspheric | 3.3919 | 1.2253 | 1.546 | 55.97 | 1.87 | |
| S8 | Aspheric | −1.2784 | 0.1209 | | | | 0.000 |
| S9 | Aspheric | −1.2883 | 0.2883 | 1.677 | 19.24 | −3.16 | 0.000 |
| S10 | Aspheric | −3.5284 | 1.0552 | | | | 0.000 |
| S11 | Aspheric | 8.0230 | 0.5804 | 1.546 | 55.97 | 7.08 | 0.000 |
| S12 | Aspheric | −7.2721 | 0.6270 | | | | 0.000 |
| S13 | Aspheric | 4.1395 | 0.4501 | 1.666 | 20.32 | 6.35 | 0.000 |
| S14 | Aspheric | 185.8398 | 0.2551 | | | | 0.000 |
| S15 | Spherical | Infinite | 0.2100 | 1.518 | 64.17 | | 0.000 |
| S16 | Spherical | Infinite | 0.3833 | | | | |
| S17 | Spherical | Infinite | | | | | |

TABLE 4

| Surface number | A4 | A6 | A8 | A10 | A12 | A14 | A16 |
|---|---|---|---|---|---|---|---|
| S1 | −7.9771E−03 | 6.1062E−02 | −2.0538E−02 | 3.4865E−03 | −3.6136E−04 | 2.4472E−05 | −1.1236E−06 |
| S2 | 1.6396E−01 | 1.2532E−01 | 3.6123E−02 | 2.2831E−02 | 1.0466E−02 | 8.0510E−03 | 4.3090E−03 |
| S3 | −2.4407E−02 | 7.7974E−03 | −1.5523E−03 | 7.2916E−04 | −3.7552E−04 | −3.4617E−05 | 1.8766E−05 |
| S4 | 4.2874E−02 | −2.9871E−03 | −2.0064E−04 | 2.4117E−04 | −2.4752E−04 | 9.0995E−05 | 1.3199E−06 |
| S5 | 4.4617E−02 | −7.4582E−03 | 1.4924E−03 | −1.9637E−04 | 7.9429E−05 | 1.4948E−06 | −1.2209E−05 |
| S6 | 4.0820E−02 | −6.6522E−03 | 1.6035E−03 | −3.2849E−04 | 1.1822E−04 | −3.3883E−05 | −1.3755E−06 |
| S7 | 1.9434E−02 | −3.6166E−03 | 7.5758E−04 | −2.0777E−04 | 3.3805E−05 | −2.2465E−05 | −2.4778E−06 |
| S8 | 8.5603E−02 | −1.0072E−02 | 2.1343E−03 | 5.7928E−05 | −1.7803E−04 | 5.4996E−05 | 6.2458E−05 |
| S9 | 9.4212E−02 | −1.5348E−02 | 1.9699E−03 | 1.8864E−04 | −1.1308E−04 | 1.5055E−04 | 5.9433E−05 |
| S10 | 7.8410E−02 | −3.1861E−03 | 1.2727E−03 | 3.5087E−05 | 1.0964E−04 | 9.7435E−05 | −3.8235E−05 |
| S11 | −5.0160E−01 | 3.3947E−02 | −2.6976E−02 | 1.1789E−02 | −8.2943E−03 | 3.8173E−03 | −2.6680E−03 |
| S12 | −2.9820E−01 | 1.8086E−01 | −5.9147E−02 | 3.0875E−02 | −2.0189E−02 | 8.7024E−03 | −4.9762E−03 |
| S13 | −2.4810E+00 | 6.5851E−01 | −2.0902E−01 | 6.2251E−02 | −3.2368E−02 | 4.5691E−03 | −6.1074E−03 |
| S14 | −5.4757E−01 | −1.5283E−01 | 9.8691E−02 | −9.5116E−02 | 4.8881E−02 | −2.4564E−02 | 1.4535E−02 |

| Surface number | A18 | A20 | A22 | A24 | A26 | A28 | A30 |
|---|---|---|---|---|---|---|---|
| S1 | 3.4002E−08 | 0.0000E+00 | 0.0000E+00 | 0.0000E+00 | 0.0000E+00 | 0.0000E+00 | 0.0000E+00 |
| S2 | 3.3381E−03 | 1.8038E−03 | 1.2949E−03 | 7.4543E−04 | 4.3001E−04 | 2.2264E−04 | 5.6509E−05 |
| S3 | 1.6559E−05 | 6.4496E−06 | −9.5827E−06 | 3.0428E−05 | −3.9968E−06 | 1.8779E−06 | 0.0000E+00 |
| S4 | 1.6360E−05 | −1.0854E−05 | 1.1313E−06 | −1.3234E−06 | 8.7831E−07 | −1.3515E−07 | 0.0000E+00 |
| S5 | −4.0566E−06 | 4.1889E−06 | −1.0092E−06 | 9.0266E−08 | 0.0000E+00 | 0.0000E+00 | 0.0000E+00 |
| S6 | −2.9850E−06 | 4.0061E−06 | −1.3061E−06 | 1.7272E−07 | −7.5775E−09 | 0.0000E+00 | 0.0000E+00 |
| S7 | −1.2684E−07 | 2.3562E−06 | 2.0241E−06 | −1.8510E−06 | 4.4540E−07 | −3.3096E−08 | 0.0000E+00 |
| S8 | 4.8626E−06 | −2.7595E−05 | 3.8035E−06 | 3.4750E−06 | −1.0869E−06 | 6.2876E−08 | 0.0000E+00 |
| S9 | 5.2547E−05 | −4.0012E−05 | −6.3303E−06 | −7.0675E−06 | 7.2548E−06 | −9.1354E−07 | 0.0000E+00 |
| S10 | 1.4917E−05 | −3.1449E−05 | −5.2853E−06 | −8.7501E−06 | 2.0890E−06 | 3.8421E−06 | 0.0000E+00 |
| S11 | 3.6103E−04 | −1.0853E−03 | −5.2108E−05 | −4.8577E−04 | −5.0378E−05 | −1.9096E−04 | −1.5957E−06 |
| S12 | 1.2721E−03 | −5.1071E−04 | 3.2440E−04 | 1.7366E−05 | 3.0478E−06 | 4.9092E−07 | 0.0000E+00 |
| S13 | 2.7947E−03 | −2.7283E−03 | 1.7839E−03 | −1.7305E−03 | −7.0674E−05 | −2.6552E−06 | −2.9313E−07 |
| S14 | −6.8807E−03 | 1.9023E−03 | −7.8771E−04 | 6.4525E−04 | −2.2524E−04 | 2.0915E−05 | 9.0375E−07 |

Figure 4A:
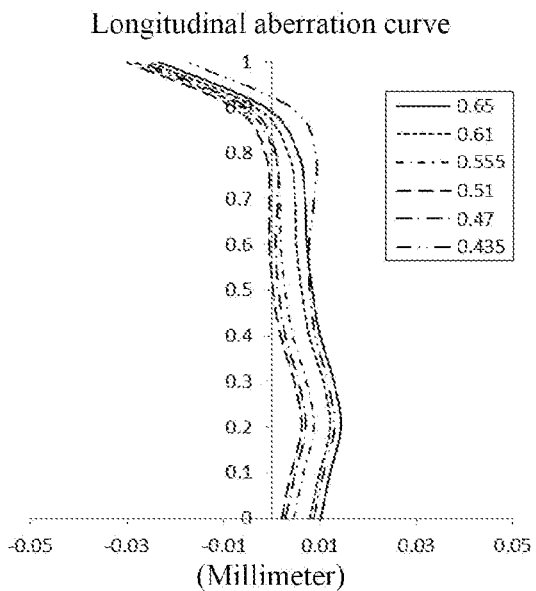
FIGS. 4A-4C respectively illustrate a longitudinal aberration curve, an astigmatic curve and a distortion curve of the optical imaging lens assembly according to Example 2.
Figure 4B:
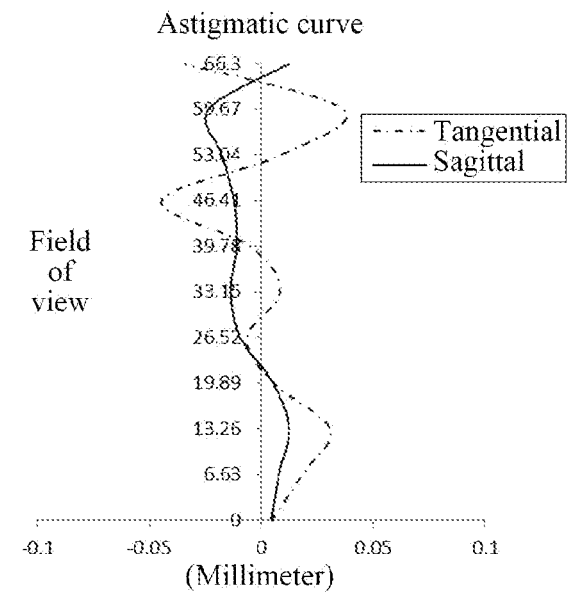
Figure 4C:
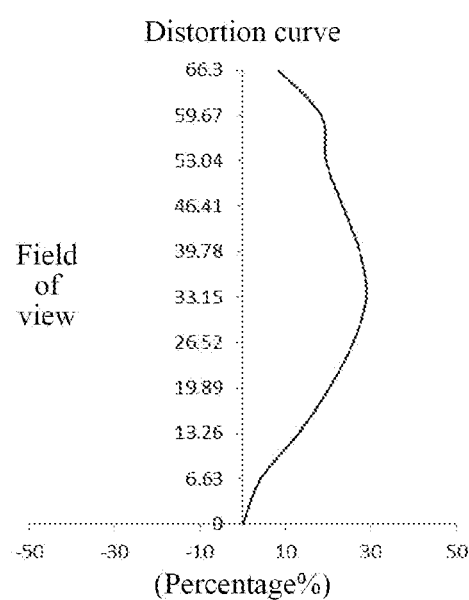

FIG. 4A illustrates the longitudinal aberration curve of the optical imaging lens assembly according to Example 2, representing deviations of focal points converged by light of of-views. It can be seen from FIG. 4A to FIG. 4C that the optical imaging lens assembly provided in Example 2 can achieve good imaging quality.

Example 3

Figure 5:
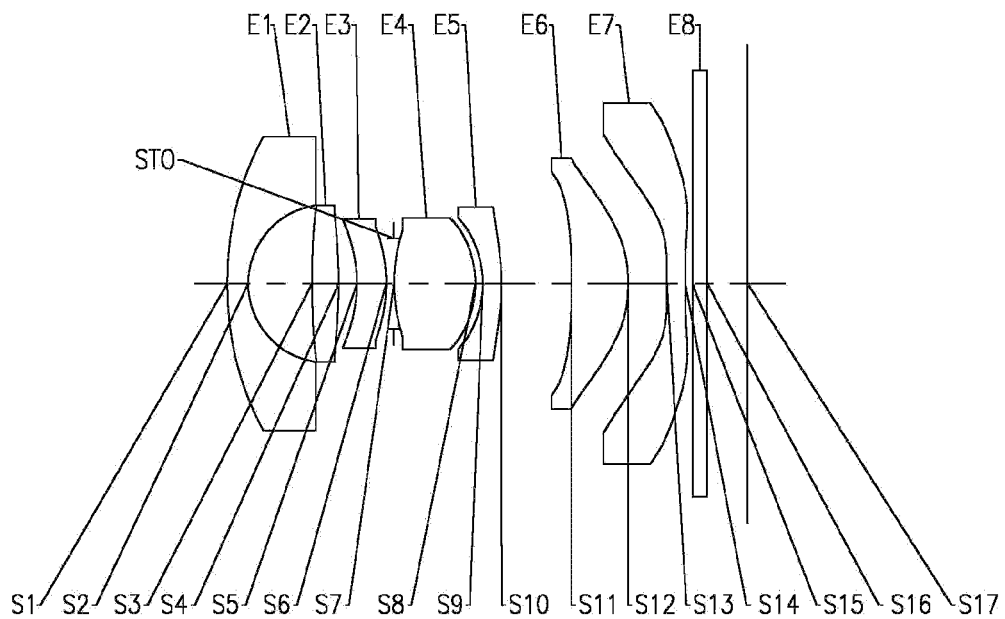
FIG. 5 is a schematic structural diagram illustrating an optical imaging lens assembly according to Example 3 of the present disclosure.

An optical imaging lens assembly according to Example 3 of the present disclosure is described below with reference to FIG. 5 to FIG. 6C. FIG. 5 illustrates a schematic structural diagram of the optical imaging lens assembly according to Example 3 of the present disclosure.

As shown in FIG. 5, the optical imaging lens assembly along an optical axis from an object side to an image side sequentially includes: a first lens E1, a second lens E2, a third lens E3, a diaphragm STO, a fourth lens E4, a fifth lens E5, a sixth lens E6, a seventh lens E7 and an optical filter E8.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has negative refractive power, an object-side surface S5 of the third lens is a concave surface, and an image-side surface S6 of the third lens is a convex surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a convex surface. The sixth lens E6 has positive refractive power, an object-side surface S11 of the sixth lens is a convex surface, and an image-side surface S12 of the sixth lens is a convex surface. The seventh lens E7 has positive refractive power, an object-side surface S13 of the seventh lens is a convex surface, and an image-side surface S14 of the seventh lens is a convex surface. The optical filter E8 has an object-side surface S15 and an image-side surface S16. The optical imaging lens assembly has an imaging plane S17. Light from an object sequentially passes through the respective surfaces S1 to S16 and is finally imaged on the imaging plane S17.

In Example 3, the total effective focal length f of the optical imaging lens assembly is 1.77 mm, and the maximum field-of-view FOV is 134.6°.

Table 5 is a table illustrating basic parameters of the optical imaging lens assembly of Example 3, where the units for the radius of curvature, the thickness and the focal length are millimeter (mm). Table 6 shows high-order coefficients applicable to each aspheric surface in Example 3, where the surface shape of each aspheric surface may be defined by the formula (1) given in the above Example 1.

TABLE 5

| Surface number | Surface type | Radius of curvature | Thickness | Refractive index | Abbe number | Focal length | Conic coefficient |
|---|---|---|---|---|---|---|---|
| OBJ | Spherical | Infinite | Infinite | | | | |
| S1 | Aspheric | 5.0849 | 0.2919 | 1.546 | 56.09 | −2.53 | 0.000 |
| S2 | Aspheric | 1.0649 | 0.8950 | | | | −1.000 |
| S3 | Aspheric | 10.4893 | 0.3752 | 1.677 | 19.24 | 6.32 | 0.000 |
| S4 | Aspheric | −7.1129 | 0.2585 | | | | 0.000 |
| S5 | Aspheric | −1.8567 | 0.4095 | 1.546 | 56.09 | −105.70 | 0.000 |
| S6 | Aspheric | −2.0678 | 0.1000 | | | | 0.000 |
| STO | Spherical | Infinite | 0.0100 | | | | |
| S7 | Aspheric | 2.4121 | 1.1425 | 1.546 | 56.09 | 1.73 | 0.000 |
| S8 | Aspheric | −1.2930 | 0.1040 | | | | 0.000 |
| S9 | Aspheric | −1.1953 | 0.2621 | 1.677 | 19.24 | −3.48 | 0.000 |
| S10 | Aspheric | −2.6411 | 0.9820 | | | | 0.000 |
| S11 | Aspheric | −26.5808 | 0.7938 | 1.546 | 56.09 | 4.82 | 0.000 |
| S12 | Aspheric | −2.4181 | 0.5442 | | | | 0.000 |
| S13 | Aspheric | 47.4667 | 0.2564 | 1.537 | 55.71 | 29.67 | 0.000 |
| S14 | Aspheric | −23.9115 | 0.1000 | | | | 0.000 |
| S15 | Spherical | Infinite | 0.2100 | 1.518 | 64.17 | | |
| S16 | Spherical | Infinite | 0.5649 | | | | |
| S17 | Spherical | Infinite | | | | | |

TABLE 6

| Surface number | A4 | A6 | A8 | A10 | A12 | A14 | A16 |
|---|---|---|---|---|---|---|---|
| S1 | 7.5239E−02 | −8.6430E−03 | 8.8915E−04 | −6.3169E−05 | 3.1614E−06 | −1.0440E−07 | 0.0000E+00 |
| S2 | 2.5550E−01 | 7.1379E−02 | 2.5942E−02 | 1.3786E−02 | 7.3670E−03 | 4.3592E−03 | 2.6426E−03 |
| S3 | 4.7353E−03 | 3.0191E−03 | −1.1483E−03 | 3.0752E−04 | −1.1391E−04 | 1.0051E−05 | −4.1727E−09 |
| S4 | 1.5769E−02 | −1.1040E−03 | −2.6396E−04 | 2.9263E−04 | −1.3433E−04 | 1.5121E−05 | −4.4349E−06 |
| S5 | 3.4934E−02 | −2.3396E−03 | 5.9781E−04 | −2.0446E−04 | −1.0966E−05 | 2.9208E−05 | 2.3053E−08 |
| S6 | 1.4461E−02 | −1.9113E−03 | 4.4145E−04 | −2.3168E−04 | 6.6901E−05 | −9.8743E−06 | 7.6592E−06 |
| S7 | 1.6565E−03 | −1.0991E−03 | −5.7150E−05 | 8.8261E−06 | −3.7162E−05 | 1.6362E−05 | −1.8176E−05 |
| S8 | 4.0888E−02 | −1.3180E−02 | 3.1025E−03 | −4.2338E−05 | 1.6932E−04 | −1.0507E−04 | −2.8682E−05 |
| S9 | 1.0320E−01 | −1.9712E−02 | 7.2173E−03 | 1.6036E−04 | 4.2203E−04 | −1.2221E−04 | −6.6962E−05 |
| S10 | 1.1885E−01 | −1.4058E−02 | 5.1714E−03 | −5.6410E−04 | 2.0783E−04 | −2.5594E−05 | −2.2963E−05 |
| S11 | −2.3578E−01 | 4.1128E−03 | −1.2532E−02 | 5.0864E−03 | −2.3820E−03 | 9.1678E−04 | −4.3091E−04 |
| S12 | −1.5065E−01 | 1.2806E−01 | −3.1999E−02 | 1.7708E−02 | −6.4333E−03 | 1.7211E−03 | −1.0492E−03 |
| S13 | −1.2285E+00 | 3.7432E−01 | −1.0676E−01 | 2.6692E−02 | −2.6641E−03 | 9.1798E−05 | −4.2465E−04 |
| S14 | −3.3459E−01 | −4.6057E−02 | 5.2519E−02 | −5.5132E−02 | 3.7292E−02 | −1.9050E−02 | 9.4572E−03 |

TABLE 6-continued

| Surface number | A18 | A20 | A22 | A24 | A26 | A28 | A30 |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | 1.6341E-03 | 1.0169E-03 | 6.2885E-04 | 3.8166E-04 | 2.2204E-04 | 1.2221E-04 | 5.0350E-05 |
| S3 | 1.7331E-05 | -2.8048E-06 | -3.6026E-06 | 9.3948E-07 | 0.0000E+00 | 0.0000E+00 | 0.0000E+00 |
| S4 | 9.9423E-06 | -4.5442E-06 | 6.3637E-07 | 0.0000E+00 | 0.0000E+00 | 0.0000E+00 | 0.0000E+00 |
| S5 | -2.5851E-06 | 2.1999E-08 | 7.5178E-08 | 0.0000E+00 | 0.0000E+00 | 0.0000E+00 | 0.0000E+00 |
| S6 | -1.1476E-05 | 1.1790E-05 | -6.0442E-06 | 1.4003E-06 | -1.0964E-07 | 0.0000E+00 | 0.0000E+00 |
| S7 | 1.7782E-05 | -7.5005E-06 | 6.3921E-06 | -2.4506E-06 | 0.0000E+00 | 0.0000E+00 | 0.0000E+00 |
| S8 | 3.9699E-05 | 3.5618E-06 | -3.8764E-06 | -3.5571E-07 | 0.0000E+00 | 0.0000E+00 | 0.0000E+00 |
| S9 | 3.9163E-05 | 1.7162E-05 | -6.6491E-06 | 1.6351E-06 | 0.0000E+00 | 0.0000E+00 | 0.0000E+00 |
| S10 | 1.2729E-05 | 6.6738E-06 | -6.0375E-06 | 2.9337E-07 | 0.0000E+00 | 0.0000E+00 | 0.0000E+00 |
| S11 | 3.2151E-04 | -1.0316E-04 | 4.6431E-05 | -4.0403E-05 | -6.8989E-07 | 0.0000E+00 | 0.0000E+00 |
| S12 | 4.2227E-04 | -7.5643E-05 | -5.0709E-05 | -6.0707E-06 | -1.0372E-06 | -1.7559E-07 | 0.0000E+00 |
| S13 | 7.5135E-04 | -1.1650E-03 | 5.0991E-04 | -1.0388E-04 | -8.7800E-06 | -1.2774E-06 | -1.9535E-07 |
| S14 | -3.8003E-03 | 8.9414E-04 | -9.2368E-05 | 1.6495E-06 | 0.0000E+00 | 0.0000E+00 | 0.0000E+00 |

Figures 6A, 6B:
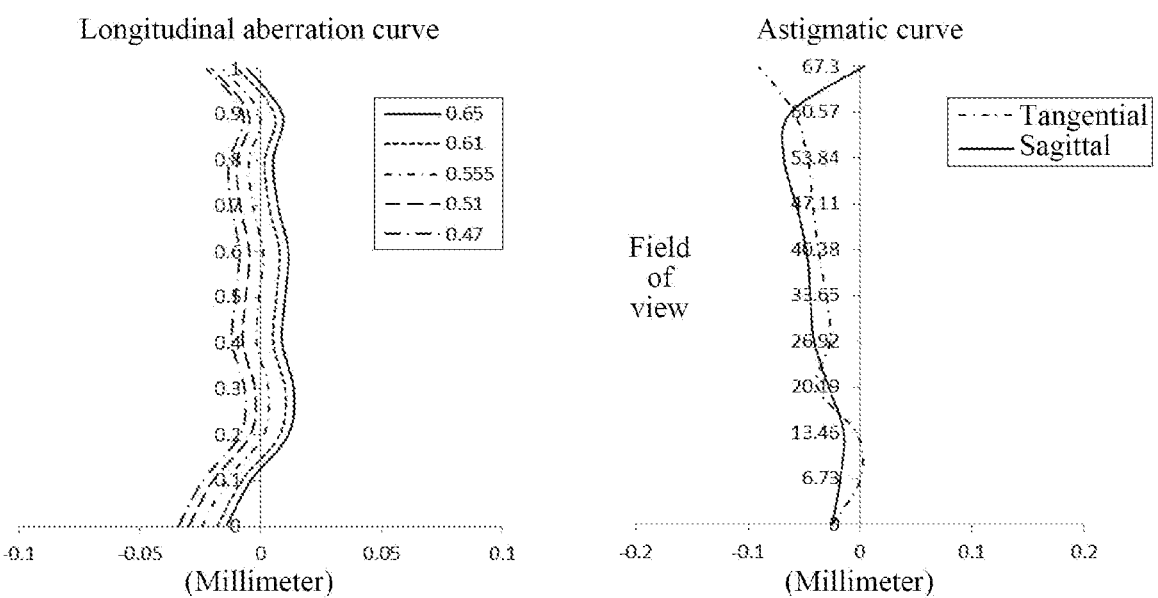
FIGS. 6A-6C respectively illustrate a longitudinal aberration curve, an astigmatic curve and a distortion curve of the optical imaging lens assembly according to Example 3.
Figure 6C:
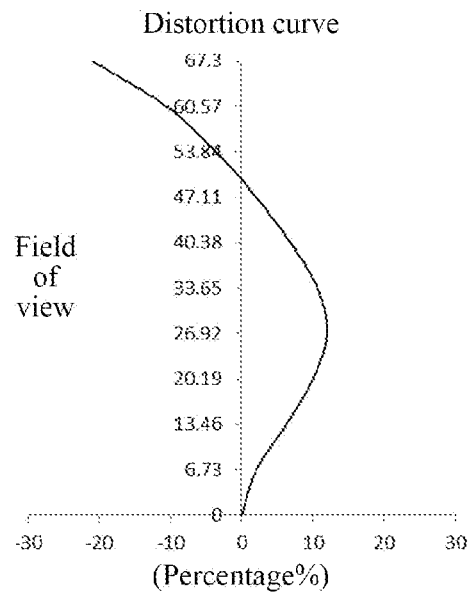

FIG. 6A illustrates the longitudinal aberration curve of the optical imaging lens assembly according to Example 3, representing deviations of focal points converged by light of different wavelengths after passing through the lens assembly. FIG. 6B illustrates the astigmatic curve of the optical imaging lens assembly according to Example 3, representing a curvature of a tangential plane and a curvature of a sagittal plane. FIG. 6C illustrates the distortion curve of the optical imaging lens assembly according to Example 3, representing the amounts of distortion corresponding to different field-of-views. It can be seen from FIG. 6A to FIG. 6C that the optical imaging lens assembly provided in Example 3 can achieve good imaging quality.

Example 4

Figure 7:
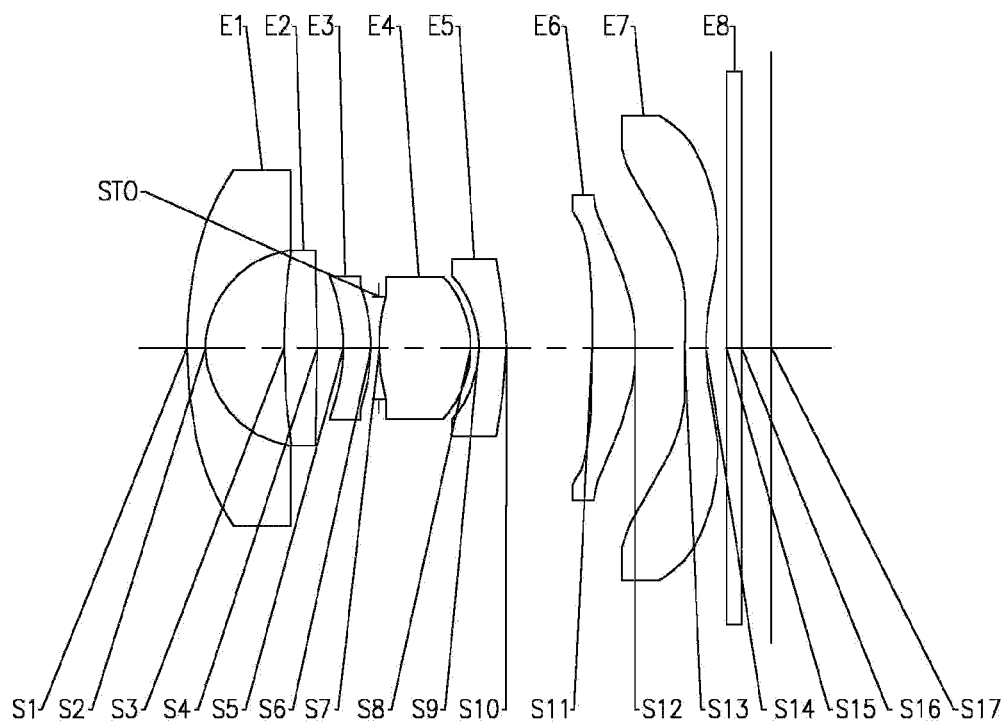
FIG. 7 is a schematic structural diagram illustrating an optical imaging lens assembly according to Example 4 of the present disclosure.

An optical imaging lens assembly according to Example 4 of the present disclosure is described below with reference to FIG. 7 to FIG. 8C. FIG. 7 illustrates a schematic structural diagram of the optical imaging lens assembly according to Example 4 of the present disclosure.

As shown in FIG. 7, the optical imaging lens assembly along an optical axis from an object side to an image side sequentially includes: a first lens E1, a second lens E2, a third lens E3, a diaphragm STO, a fourth lens E4, a fifth lens E5, a sixth lens E6, a seventh lens E7 and an optical filter E8.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has positive refractive power, an object-side surface S5 of the third lens is a concave surface, and an image-side surface S6 of the third lens is a convex surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a convex surface. The sixth lens E6 has positive refractive power, an object-side surface S11 of the sixth lens is a convex surface, and an image-side surface S12 of the sixth lens is a convex surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. The optical imaging lens assembly has an imaging plane S17. Light from an object sequentially passes through the respective surfaces S1 to S16 and is finally imaged on the imaging plane S17.

In Example 4, the total effective focal length f of the optical imaging lens assembly is 2.01 mm, and the maximum field-of-view FOV is 133.4°.

Table 7 is a table illustrating basic parameters of the optical imaging lens assembly of Example 4, where the units for the radius of curvature, the thickness and the focal length are millimeter (mm). Table 8 shows high-order coefficients applicable to each aspheric surface in Example 4, where the surface shape of each aspheric surface may be defined by the formula (1) given in the above Example 1.

TABLE 7

| Surface number | Surface type | Radius of curvature | Thickness | Material Refractive index | Material Abbe number | Focal length | Conic coefficient |
|---|---|---|---|---|---|---|---|
| OBJ | Spherical | Infinite | Infinite | | | | |
| S1 | Aspheric | 6.3517 | 0.2600 | 1.546 | 56.09 | -3.02 | 0.000 |
| S2 | Aspheric | 1.2900 | 1.1020 | | | | -1.000 |
| S3 | Aspheric | 9.1951 | 0.4650 | 1.677 | 19.24 | 7.47 | 0.000 |
| S4 | Aspheric | -11.0020 | 0.3682 | | | | 0.000 |
| S5 | Aspheric | -2.2894 | 0.3869 | 1.546 | 56.09 | 33.98 | 0.000 |
| S6 | Aspheric | -2.1595 | 0.1053 | | | | 0.000 |
| STO | Spherical | Infinite | 0.0100 | | | | |
| S7 | Aspheric | 3.1095 | 1.2831 | 1.546 | 56.09 | 1.91 | 0.000 |
| S8 | Aspheric | -1.3414 | 0.1147 | | | | 0.000 |
| S9 | Aspheric | -1.3626 | 0.3857 | 1.677 | 19.24 | -3.80 | 0.000 |
| S10 | Aspheric | -3.2247 | 1.2011 | | | | 0.000 |
| S11 | Aspheric | 12.2645 | 0.6071 | 1.546 | 56.09 | 7.21 | 0.000 |

TABLE 7-continued

| Surface number | Surface type | Radius of curvature | Thickness | Material Refractive index | Abbe number | Focal length | Conic coefficient |
|---|---|---|---|---|---|---|---|
| S12 | Aspheric | −5.6938 | 0.6924 | | | | 0.000 |
| S13 | Aspheric | 5.4767 | 0.3001 | 1.537 | 55.71 | −120.25 | 0.000 |
| S14 | Aspheric | 4.9516 | 0.2901 | | | | 0.000 |
| S15 | Spherical | Infinite | 0.2100 | 1.518 | 64.17 | | |
| S16 | Spherical | Infinite | 0.4183 | | | | |
| S17 | Spherical | Infinite | | | | | |

TABLE 8

| Surface number | A4 | A6 | A8 | A10 | A12 | A14 | A16 |
|---|---|---|---|---|---|---|---|
| S1  | 1.3148E−01  | 1.4214E−02  | −6.4904E−03 | 1.0468E−03  | −9.5862E−05 | 5.5718E−06  | −2.1325E−07 |
| S2  | 2.9513E−01  | 9.0021E−02  | 3.3507E−02  | 1.6876E−02  | 8.9536E−03  | 5.3930E−03  | 3.2414E−03  |
| S3  | −2.8668E−03 | 3.7958E−03  | −8.8265E−04 | 8.5998E−05  | −8.5926E−05 | 1.1184E−05  | 3.5927E−05  |
| S4  | 4.5226E−02  | −3.9929E−03 | −1.0848E−04 | 1.5232E−04  | −5.5120E−05 | 5.3410E−05  | 7.2967E−06  |
| S5  | 4.4586E−02  | −6.7259E−03 | 1.6376E−03  | −1.8238E−04 | −3.6636E−05 | 4.0381E−05  | −3.4659E−05 |
| S6  | 4.5928E−02  | −7.9891E−03 | 2.5053E−03  | −7.8447E−04 | 2.8409E−04  | −1.3199E−04 | 6.6298E−05  |
| S7  | 8.3216E−03  | −1.2330E−03 | −1.4186E−04 | 2.0166E−04  | −1.6354E−04 | 1.1426E−04  | −7.7866E−05 |
| S8  | 9.4297E−02  | −1.4232E−02 | 4.4942E−03  | −2.2527E−04 | 3.2766E−04  | −1.6905E−05 | −5.9610E−06 |
| S9  | 1.0444E−01  | −2.0414E−02 | 4.9939E−03  | 3.5892E−04  | 2.0367E−04  | 1.8583E−04  | −1.5170E−04 |
| S10 | 1.4342E−01  | −1.2867E−02 | 5.6160E−03  | −9.9515E−03 | 7.0618E−04  | −1.2827E−04 | 1.6858E−04  |
| S11 | −4.6602E−01 | 3.7680E−02  | −3.2133E−02 | 1.3149E−02  | −7.6325E−03 | 4.0092E−03  | −1.8374E−03 |
| S12 | −3.1240E−01 | 1.8187E−01  | −5.1584E−02 | 3.0319E−02  | −1.5825E−02 | 7.6003E−03  | −3.7649E−03 |
| S13 | −2.1440E+00 | 6.0314E−01  | −1.6262E−01 | 5.9539E−02  | −2.0359E−02 | 6.1482E−03  | −4.9115E−03 |
| S14 | −1.9012E+00 | 6.2973E−02  | −1.0978E−02 | −5.7462E−02 | 2.8925E−02  | −2.1518E−02 | 1.6258E−02  |

| Surface number | A18 | A20 | A22 | A24 | A26 | A28 | A30 |
|---|---|---|---|---|---|---|---|
| S1  | 5.2640E−09  | 0.0000E+00  | 0.0000E+00  | 0.0000E+00  | 0.0000E+00  | 0.0000E+00  | 0.0000E+00  |
| S2  | 2.0003E−03  | 1.2421E−03  | 7.6627E−04  | 4.6414E−04  | 2.6935E−04  | 1.4787E−04  | 6.0606E−05  |
| S3  | −1.3275E−05 | −6.4644E−07 | 8.4958E−07  | −9.3947E−08 | 0.0000E+00  | 0.0000E+00  | 0.0000E+00  |
| S4  | −1.6514E−05 | −1.6920E−06 | 1.8087E−06  | 0.0000E+00  | 0.0000E+00  | 0.0000E+00  | 0.0000E+00  |
| S5  | 1.3802E−05  | −2.3240E−06 | 1.2508E−07  | 0.0000E+00  | 0.0000E+00  | 0.0000E+00  | 0.0000E+00  |
| S6  | −5.4311E−05 | 3.4772E−05  | −1.1631E−05 | 1.8498E−06  | −1.0332E−07 | 0.0000E+00  | 0.0000E+00  |
| S7  | 4.4285E−05  | −1.5779E−05 | 2.8995E−06  | −1.9997E−07 | 0.0000E+00  | 0.0000E+00  | 0.0000E+00  |
| S8  | −3.2326E−05 | 3.8989E−05  | −2.1120E−05 | 3.2757E−06  | 0.0000E+00  | 0.0000E+00  | 0.0000E+00  |
| S9  | 4.5970E−05  | −1.6398E−05 | 1.8439E−05  | −5.3483E−06 | 0.0000E+00  | 0.0000E+00  | 0.0000E+00  |
| S10 | −2.2857E−05 | 1.2777E−04  | −1.1268E−05 | 7.0165E−05  | 4.8245E−07  | 0.0000E+00  | 0.0000E+00  |
| S11 | 6.2269E−04  | −4.9969E−04 | 1.3217E−04  | −1.3033E−04 | −1.2774E−06 | 0.0000E+00  | 0.0000E+00  |
| S12 | 8.3701E−04  | −5.6174E−04 | 1.5828E−04  | 6.4895E−06  | 4.1914E−07  | 2.9290E−08  | 0.0000E+00  |
| S13 | 2.9247E−03  | −2.3848E−03 | 2.0672E−03  | −6.1382E−04 | −3.4979E−05 | −3.1876E−06 | −3.1158E−07 |
| S14 | −5.8484E−03 | 2.3434E−03  | −8.8007E−04 | 1.0079E−04  | 5.0842E−06  | 4.5928E−07  | 4.7749E−08  |

Figures 8A, 8B:
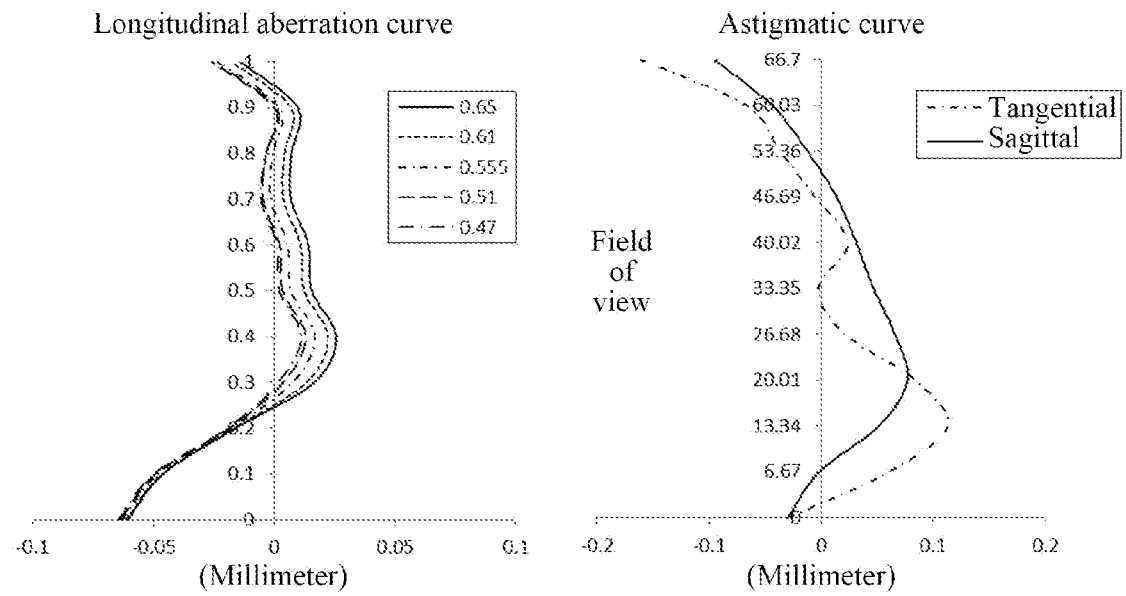
FIGS. 8A-8C respectively illustrate a longitudinal aberration curve, an astigmatic curve and a distortion curve of the optical imaging lens assembly according to Example 4.
Figure 8C:
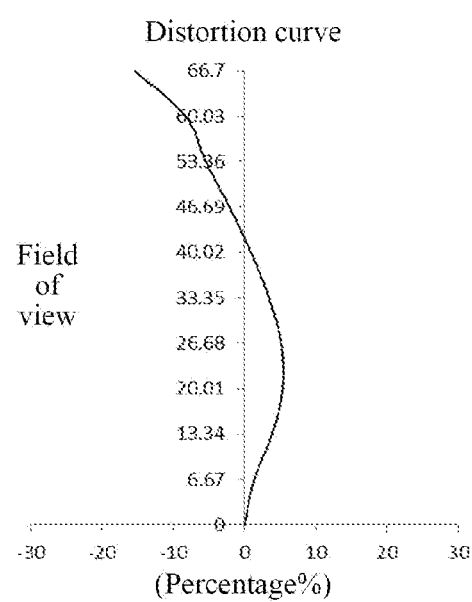

FIG. 8A illustrates the longitudinal aberration curve of the optical imaging lens assembly according to Example 4, representing deviations of focal points converged by light of different wavelengths after passing through the lens assembly. FIG. 8B illustrates the astigmatic curve of the optical imaging lens assembly according to Example 4, representing a curvature of a tangential plane and a curvature of a sagittal plane. FIG. 8C illustrates the distortion curve of the optical imaging lens assembly according to Example 4, representing the amounts of distortion corresponding to different field-of-views. It can be seen from FIG. 8A to FIG. 8C that the optical imaging lens assembly provided in Example 4 can achieve good imaging quality.

Example 5

Figure 9:
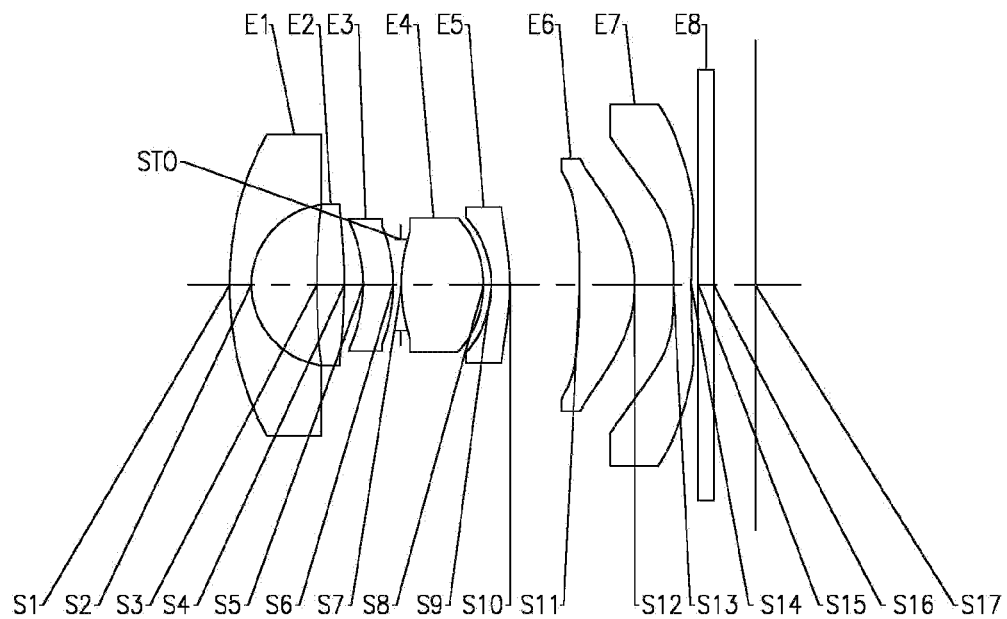
FIG. 9 is a schematic structural diagram illustrating an optical imaging lens assembly according to Example 5 of the present disclosure.

An optical imaging lens assembly according to Example 5 of the present disclosure is described below with reference to FIG. 9 to FIG. 10C. FIG. 9 illustrates a schematic structural diagram of the optical imaging lens assembly according to Example 5 of the present disclosure.

As shown in FIG. 9, the optical imaging lens assembly along an optical axis from an object side to an image side sequentially includes: a first lens E1, a second lens E2, a third lens E3, a diaphragm STO, a fourth lens E4, a fifth lens E5, a sixth lens E6, a seventh lens E7 and an optical filter E8.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has negative refractive power, an object-side surface S5 of the third lens is a concave surface, and an image-side surface S6 of the third lens is a convex surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a convex surface. The sixth lens E6 has positive refractive power, an object-side surface S11 of the sixth lens is a concave surface, and an image-side surface S12 of the sixth lens is a convex surface. The seventh lens E7 has positive refractive power, an object-side surface S13 of the seventh lens is a convex surface, and an image-side surface S14 of the seventh lens is a convex surface. The optical filter E8 has an object-side surface S15 and an image-side surface S16. The optical imaging lens assembly has an imaging plane S17. Light from an object sequentially passes through the respective surfaces S1 to S16 and is finally imaged on the imaging plane S17.

In Example 5, the total effective focal length f of the optical imaging lens assembly is 1.78 mm, and the maximum field-of-view FOV is 134.5°.

Table 9 is a table illustrating basic parameters of the optical imaging lens assembly of Example 5, where the units for the radius of curvature, the thickness and the focal length are millimeter (mm). Table 10 shows high-order coefficients applicable to each aspheric surface in Example 5, where the surface shape of each aspheric surface may be defined by the formula (1) given in the above Example 1.

TABLE 9

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| S1 | Aspheric | 5.2776 | 0.3007 | 1.546 | 56.09 | −2.61 | 0.000 |
| S2 | Aspheric | 1.0990 | 0.9219 | | | | −1.000 |
| S3 | Aspheric | 10.7439 | 0.3864 | 1.677 | 19.24 | 6.42 | 0.000 |
| S4 | Aspheric | −7.1895 | 0.2663 | | | | 0.000 |
| S5 | Aspheric | −1.9190 | 0.4218 | 1.546 | 56.09 | −120.93 | 0.000 |
| S6 | Aspheric | −2.1298 | 0.1030 | | | | 0.000 |
| STO | Spherical | Infinite | 0.0103 | | | | |
| S7 | Aspheric | 2.4915 | 1.1514 | 1.546 | 56.09 | 1.78 | 0.000 |
| S8 | Aspheric | −1.3328 | 0.1107 | | | | 0.000 |
| S9 | Aspheric | −1.2323 | 0.2580 | 1.677 | 19.24 | −3.57 | 0.000 |
| S10 | Aspheric | −2.7274 | 0.9796 | | | | 0.000 |
| S11 | Aspheric | −51.2993 | 0.7687 | 1.546 | 56.09 | 4.96 | 0.000 |
| S12 | Aspheric | −2.5881 | 0.5449 | | | | 0.000 |
| S13 | Aspheric | 33.9615 | 0.2516 | 1.537 | 55.71 | 26.46 | 0.000 |
| S14 | Aspheric | −24.3274 | 0.1010 | | | | 0.000 |
| S15 | Spherical | Infinite | 0.2163 | 1.518, | 64.17 | | |
| S16 | Spherical | Infinite | 0.5819 | | | | |
| S17 | Spherical | Infinite | | | | | |

TABLE 10

| Surface number | A4 | A6 | A8 | A10 | A12 | A14 | A16 |
|---|---|---|---|---|---|---|---|
| S1 | 8.2947E−02 | −9.8607E−03 | 1.0543E−03 | −7.7847E−05 | 4.0301E−06 | −1.3762E−07 | 0.0000E+00 |
| S2 | 2.6298E−01 | 7.2504E−02 | 2.6481E−02 | 1.3921E−02 | 7.4039E−03 | 4.3580E−03 | 2.6279E−03 |
| S3 | 4.4793E−03 | 3.2181E−03 | −1.1829E−03 | 2.9501E−04 | −1.0040E−04 | 1.1877E−06 | 3.7326E−06 |
| S4 | 1.7966E−02 | −1.1997E−03 | −2.7655E−04 | 3.0053E−04 | −1.3405E−04 | 1.4565E−05 | −5.0402E−06 |
| S5 | 3.5159E−02 | −2.6536E−03 | 6.7640E−04 | −2.2895E−04 | −2.1726E−07 | 2.1202E−05 | 4.6402E−06 |
| S6 | 1.4311E−02 | −1.8632E−03 | 4.4793E−04 | −2.2421E−04 | 6.0561E−05 | −9.5815E−06 | 8.4135E−06 |
| S7 | 2.3636E−03 | −1.1953E−03 | 2.1580E−05 | −2.9324E−05 | −1.5070E−05 | 5.3025E−06 | −8.3268E−06 |
| S8 | 4.2086E−02 | −1.3578E−02 | 3.1955E−03 | −4.4020E−05 | 1.7430E−04 | −1.0823E−04 | −2.9528E−05 |
| S9 | 1.0660E−01 | −2.0643E−02 | 7.4053E−03 | 2.1172E−04 | 4.6091E−04 | −1.1446E−04 | −7.2792E−05 |
| S10 | 1.2236E−01 | −1.4484E−02 | 5.3265E−03 | −5.8126E−04 | 2.1407E−04 | −2.6370E−05 | −2.3648E−05 |
| S11 | −2.4432E−01 | 5.7257E−03 | −1.3673E−02 | 5.3075E−03 | −2.3832E−03 | 9.8725E−04 | −4.3461E−04 |
| S12 | −1.5884E−01 | 1.2125E−01 | −3.2711E−02 | 1.6812E−02 | −5.7391E−03 | 1.7169E−03 | −9.6107E−04 |
| S13 | −1.2058E+00 | 3.2547E−01 | −8.3374E−02 | 1.6658E−02 | −2.0828E−04 | −9.8393E−05 | −6.1645E−04 |
| S14 | −3.0549E−01 | −4.8606E−02 | 5.7424E−02 | −5.6117E−02 | 3.5333E−02 | −1.7789E−02 | 8.4256E−03 |

| Surface number | A18 | A20 | A22 | A24 | A26 | A28 | A30 |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | 1.6172E−03 | 1.0016E−03 | 6.1677E−04 | 3.7281E−04 | 2.1618E−04 | 1.1861E−04 | 4.8830E−05 |
| S3 | 1.7821E−05 | −3.2963E−06 | −3.7916E−06 | 1.0217E−06 | 0.0000E+00 | 0.0000E+00 | 0.0000E+00 |
| S4 | 1.0126E−05 | −4.4501E−06 | 6.0585E−07 | 0.0000E+00 | 0.0000E+00 | 0.0000E+00 | 0.0000E+00 |
| S5 | −3.5347E−06 | 3.3712E−08 | 8.2509E−08 | 0.0000E+00 | 0.0000E+00 | 0.0000E+00 | 0.0000E+00 |
| S6 | −1.2610E−05 | 1.1511E−05 | −5.2225E−06 | 1.0905E−06 | −7.7815E−08 | 0.0000E+00 | 0.0000E+00 |
| S7 | 1.1441E−05 | −3.8379E−06 | 1.8199E−06 | −7.2056E−07 | 0.0000E+00 | 0.0000E+00 | 0.0000E+00 |
| S8 | 4.0884E−05 | 3.6624E−06 | −3.9931E−06 | −3.6594E−07 | 0.0000E+00 | 0.0000E+00 | 0.0000E+00 |
| S9 | 3.1327E−05 | 1.1651E−05 | −1.3450E−05 | −1.0464E−06 | 0.0000E+00 | 0.0000E+00 | 0.0000E+00 |
| S10 | 1.3111E−05 | 6.8727E−06 | −6.2184E−06 | 3.0252E−07 | 0.0000E+00 | 0.0000E+00 | 0.0000E+00 |
| S11 | 3.0314E−04 | −9.4175E−05 | 3.6932E−05 | −3.7706E−05 | −5.5606E−07 | 0.0000E+00 | 0.0000E+00 |
| S12 | 3.6041E−04 | −2.2439E−05 | −2.9037E−05 | −2.7604E−06 | −3.5598E−07 | 0.0000E+00 | 0.0000E+00 |
| S13 | 1.2493E−03 | −1.1019E−03 | 2.7918E−04 | −7.5570E−05 | −6.2560E−06 | −7.6785E−07 | 0.0000E+00 |
| S14 | −2.9978E−03 | 6.1219E−04 | −5.5381E−05 | 9.0596E−07 | 0.0000E+00 | 0.0000E+00 | 0.0000E+00 |

Figure 10A:
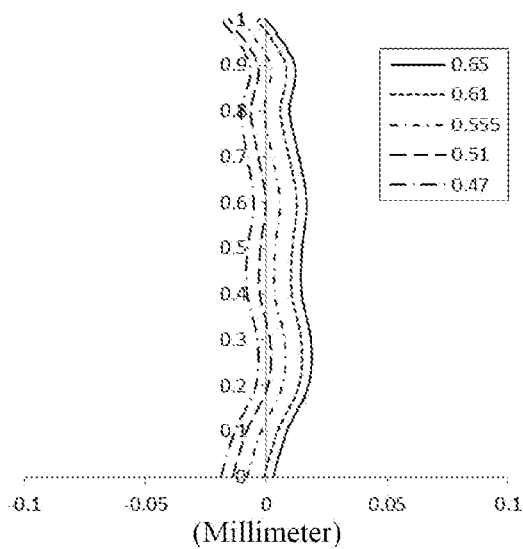
FIGS. 10A-10C respectively illustrate a longitudinal aberration curve, an astigmatic curve and a distortion curve of the optical imaging lens assembly according to Example 5.
Figure 10B:
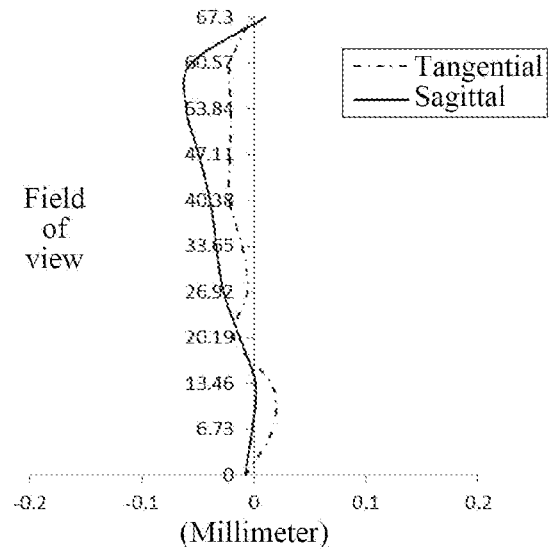
Figure 10C:
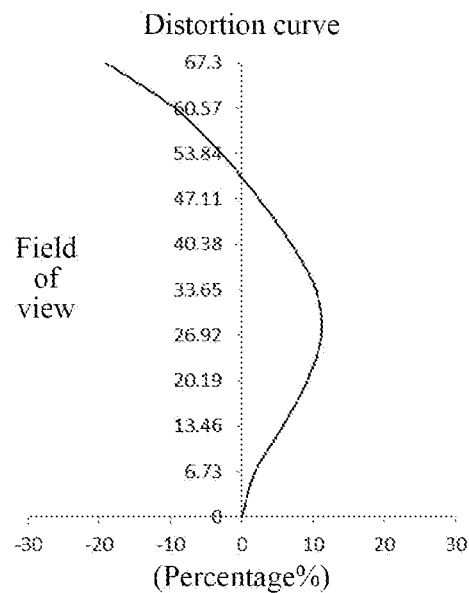

FIG. 10A illustrates the longitudinal aberration curve of the optical imaging lens assembly according to Example 5, representing deviations of focal points converged by light of different wavelengths after passing through the lens assembly. FIG. 10B illustrates the astigmatic curve of the optical imaging lens assembly according to Example 5, representing a curvature of a tangential plane and a curvature of a sagittal plane. FIG. 10C illustrates the distortion curve of the optical imaging lens assembly according to Example 5, representing the amounts of distortion corresponding to different field-of-views. It can be seen from FIG. 10A to FIG. 10C that the optical imaging lens assembly provided in Example 5 can achieve good imaging quality.

Example 6

Figure 11:
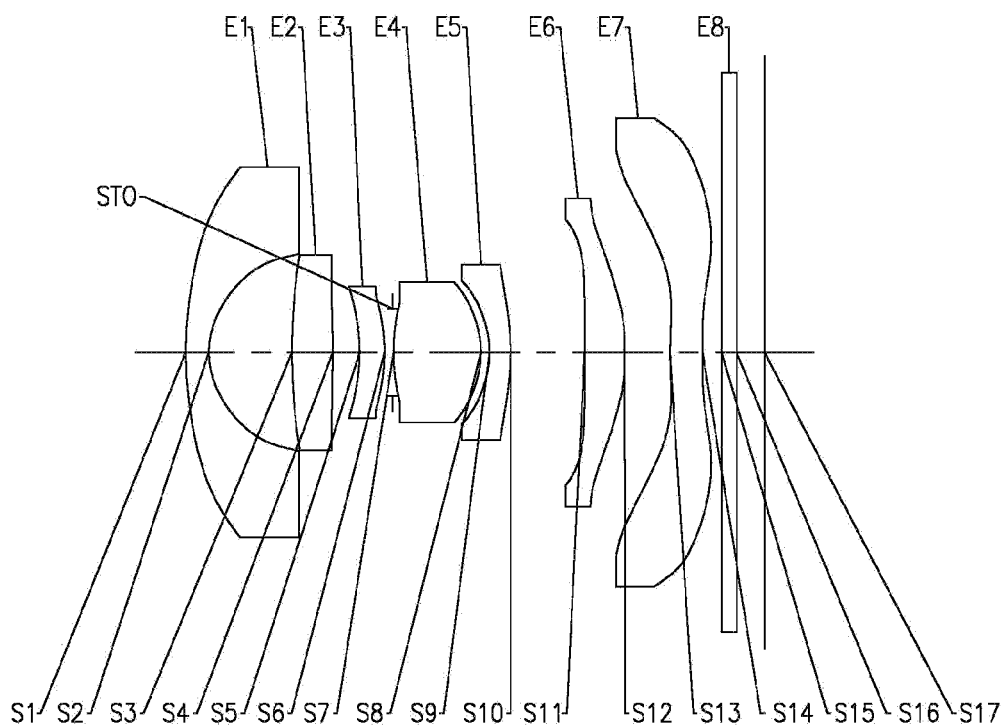
FIG. 11 is a schematic structural diagram illustrating an optical imaging lens assembly according to Example 6 of the present disclosure.

An optical imaging lens assembly according to Example 6 of the present disclosure is described below with reference to FIG. 11 to FIG. 12C. FIG. 11 illustrates a schematic structural diagram of the optical imaging lens assembly according to Example 6 of the present disclosure.

As shown in FIG. 11, the optical imaging lens assembly along an optical axis from an object side to an image side sequentially includes: a first lens E1, a second lens E2, a third lens E3, a diaphragm STO, a fourth lens E4, a fifth lens E5, a sixth lens E6, a seventh lens E7 and an optical filter E8.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has positive refractive power, an object-side surface S5 of the third lens is a concave surface, and an image-side surface S6 of the third lens is a convex surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a convex surface. The sixth lens E6 has positive refractive power, an object-side surface S11 of the sixth lens is a convex surface, and an image-side surface S12 of the sixth lens is a convex surface. The seventh lens E7 has positive refractive power, an object-side surface S13 of the seventh lens is a convex surface, and an image-side surface S14 of the seventh lens is a convex surface. The optical filter E8 has an object-side surface S15 and an image-side surface S16. The optical imaging lens assembly has an imaging plane S17. Light from an object sequentially passes through the respective surfaces S1 to S16 and is finally imaged on the imaging plane S17.

In Example 6, the total effective focal length f of the optical imaging lens assembly is 1.66 mm, and the maximum field-of-view FOV is 133.6°.

Table 11 is a table illustrating basic parameters of the optical imaging lens assembly of Example 6, where the units for the radius of curvature, the thickness and the focal length are millimeter (mm). Table 12 shows high-order coefficients applicable to each aspheric surface in Example 6, where the surface shape of each aspheric surface may be defined by the formula (1) given in the above Example 1.

TABLE 11

| Surface number | Surface type | Radius of curvature | Thickness | Refractive index | Abbe number | Focal length | Conic coefficient |
| --- | --- | --- | --- | --- | --- | --- | --- |
| OBJ | Spherical | Infinite | Infinite | | | | |
| S1 | Aspheric | 5.0354 | 0.3225 | 1.546 | 55.97 | −2.62 | 0.000 |
| S2 | Aspheric | 1.0907 | 1.1677 | | | | −1.000 |
| S3 | Aspheric | 7.5654 | 0.5739 | 1.666 | 20.32 | 7.05 | 0.000 |
| S4 | Aspheric | −12.0393 | 0.3774 | | | | 0.000 |
| S5 | Aspheric | −2.3588 | 0.3499 | 1.546 | 55.97 | 30.35 | 0.000 |
| S6 | Aspheric | −2.1730 | 0.1117 | | | | 0.000 |
| STO | Spherical | Infinite | 0.0138 | | | | |
| S7 | Aspheric | 3.4153 | 1.2257 | 1.546 | 55.97 | 1.90 | 0.000 |
| S8 | Aspheric | −1.2994 | 0.1187 | | | | 0.000 |
| S9 | Aspheric | −1.3103 | 0.2970 | 1.677 | 19.24 | −3.25 | 0.000 |
| S10 | Aspheric | −3.5407 | 1.0388 | | | | 0.000 |
| S11 | Aspheric | 8.3419 | 0.5653 | 1.546 | 55.97 | 7.03 | 0.000 |
| S12 | Aspheric | −6.9378 | 0.6321 | | | | 0.000 |
| S13 | Aspheric | 4.0366 | 0.4574 | 1.537 | 55.71 | 5.62 | 0.000 |
| S14 | Aspheric | −11.4984 | 0.2664 | | | | 0.000 |
| S15 | Spherical | Infinite | 0.2100 | 1.518 | 64.17 | | |
| S16 | Spherical | Infinite | 0.3946 | | | | |
| S17 | Spherical | Infinite | | | | | |

TABLE 12

| Surface number | A4 | A6 | A8 | A10 | A12 | A14 | A16 |
| --- | --- | --- | --- | --- | --- | --- | --- |
| S1 | −5.9941E−03 | 5.9614E−02 | −2.0029E−02 | 3.4015E−03 | −3.5251E−04 | 2.3854E−05 | −1.0931E−06 |
| S2 | 1.6751E−01 | 1.2404E−01 | 3.6343E−02 | 2.2999E−02 | 1.0597E−02 | 8.0350E−03 | 4.3533E−03 |
| S3 | −2.2042E−02 | 7.4710E−03 | −1.3956E−03 | 5.4431E−04 | −3.7136E−04 | −8.1112E−06 | 2.1823E−05 |
| S4 | 4.1723E−02 | −2.8399E−03 | −6.2578E−05 | 9.8280E−05 | −1.9707E−04 | 8.0480E−05 | 8.5275E−06 |
| S5 | 4.3137E−02 | −7.2206E−03 | 1.3871E−03 | −1.9869E−04 | 8.3300E−05 | −1.4236E−06 | −7.3730E−06 |
| S6 | 3.9744E−02 | −6.5873E−03 | 1.5350E−03 | −3.1327E−04 | 1.1254E−04 | −2.6810E−05 | −6.5356E−07 |

TABLE 12-continued

| | | | | | | |
|---|---|---|---|---|---|---|
| S7 | 1.7426E−02 | −2.9193E−03 | 6.0686E−04 | −1.4561E−04 | 2.9415E−05 | −1.1547E−05 | −2.7100E−06 |
| S8 | 8.8690E−02 | −1.1142E−02 | 2.2892E−03 | 7.8418E−05 | −2.2897E−04 | 4.5380E−05 | 8.8306E−05 |
| S9 | 9.7580E−02 | −1.6398E−02 | 2.2562E−03 | 4.6828E−05 | −1.1811E−04 | 1.1709E−04 | 1.1681E−04 |
| S10 | 7.8305E−02 | −3.2256E−03 | 1.4777E−03 | −2.0420E−04 | 1.9395E−04 | 1.0899E−04 | 1.1130E−05 |
| S11 | −4.9306E−01 | 3.3743E−02 | −2.8001E−02 | 1.1655E−02 | −8.5925E−03 | 3.9080E−03 | −2.5715E−03 |
| S12 | −2.7485E−01 | 1.8567E−01 | −6.1243E−02 | 3.0547E−02 | −2.1836E−02 | 8.8346E−03 | −5.5049E−03 |
| S13 | −2.4142E+00 | 6.4418E−01 | −1.8500E−01 | 6.4411E−02 | −2.4626E−02 | 6.5063E−03 | −4.6945E−03 |
| S14 | 1.4321E−01 | −4.1637E−01 | 1.7186E−01 | −1.4894E−01 | 7.0715E−02 | −3.6487E−02 | 2.4095E−02 |

| Surface number | A18 | A20 | A22 | A24 | A26 | A28 | A30 |
|---|---|---|---|---|---|---|---|
| S1 | 3.2989E−08 | 0.0000E+00 | 0.0000E+00 | 0.0000E+00 | 0.0000E+00 | 0.0000E+00 | 0.0000E+00 |
| S2 | 3.3308E−03 | 1.8244E−03 | 1.3002E−03 | 7.5006E−04 | 4.3151E−04 | 2.2282E−04 | 5.5039E−05 |
| S3 | 2.1194E−05 | −1.5195E−06 | −6.4691E−06 | 2.5293E−06 | −3.6427E−07 | 1.8123E−08 | 0.0000E+00 |
| S4 | 9.6569E−06 | −7.8210E−06 | 1.5647E−07 | −7.0698E−07 | 6.2095E−07 | −9.9484E−08 | 0.0000E+00 |
| S5 | −5.2832E−06 | 3.9964E−06 | −9.2754E−07 | 8.9992E−08 | 0.0000E+00 | 0.0000E+00 | 0.0000E+00 |
| S6 | −4.4977E−06 | 4.0380E−06 | −1.1539E−06 | 1.4021E−07 | −5.7725E−09 | 0.0000E+00 | 0.0000E+00 |
| S7 | −5.8828E−07 | 8.8971E−07 | 7.3744E−07 | −5.1048E−07 | 1.0002E−07 | −6.1647E−09 | 0.0000E+00 |
| S8 | 3.6496E−06 | −4.1552E−05 | 1.2365E−05 | 1.4370E−06 | −9.1048E−07 | 6.2115E−08 | 0.0000E+00 |
| S9 | 4.8472E−05 | −6.2365E−05 | −2.7553E−06 | −1.0154E−06 | 4.7057E−06 | −7.1573E−07 | 0.0000E+00 |
| S10 | −1.1935E−05 | −4.7643E−05 | −3.8884E−06 | −3.6770E−06 | 7.2553E−07 | 4.1996E−06 | 0.0000E+00 |
| S11 | 4.9997E−04 | −1.0200E−03 | −1.2016E−05 | −4.5551E−04 | −3.7775E−05 | −1.6560E−04 | −1.3913E−06 |
| S12 | 1.6149E−03 | −3.9307E−04 | 4.6572E−04 | 2.7785E−05 | 4.8229E−06 | 7.2349E−07 | 2.7021E−08 |
| S13 | 3.3294E−03 | −2.1643E−03 | 2.2336E−03 | −1.0031E−03 | −3.3353E−05 | −6.1344E−09 | −7.5849E−08 |
| S14 | −1.0751E−02 | 4.3543E−03 | −1.8680E−03 | 7.9842E−04 | −2.4821E−04 | 2.7025E−05 | 1.2951E−06 |

Figure 12A:
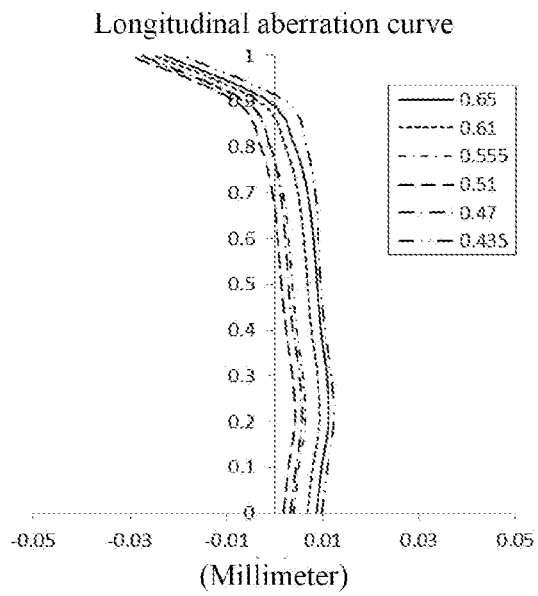
FIGS. 12A-12C respectively illustrate a longitudinal aberration curve, an astigmatic curve and a distortion curve of the optical imaging lens assembly according to Example 6.
Figure 12B:
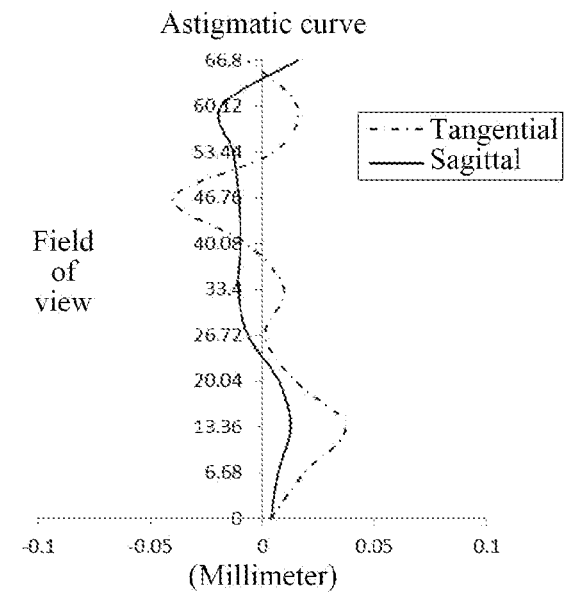
Figure 12C:
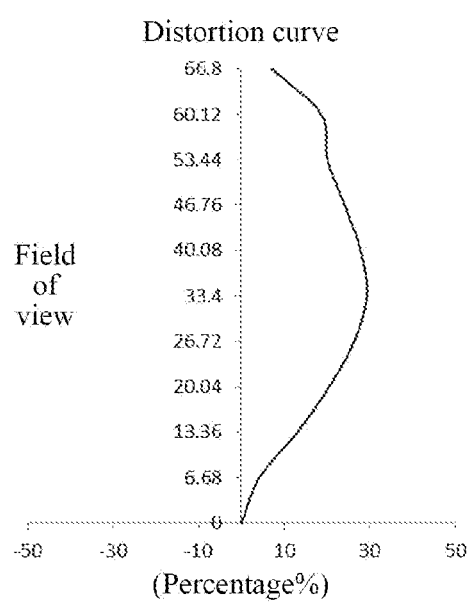

FIG. 12A illustrates the longitudinal aberration curve of the optical imaging lens assembly according to Example 6, representing deviations of focal points converged by light of different wavelengths after passing through the lens assembly. FIG. 12B illustrates the astigmatic curve of the optical imaging lens assembly according to Example 6, representing a curvature of a tangential plane and a curvature of a sagittal plane. FIG. 12C illustrates the distortion curve of the optical imaging lens assembly according to Example 6, representing the amounts of distortion corresponding to different field-of-views. It can be seen from FIG. 12A to FIG. 12C that the optical imaging lens assembly provided in Example 6 can achieve good imaging quality.

Example 7

Figure 13:
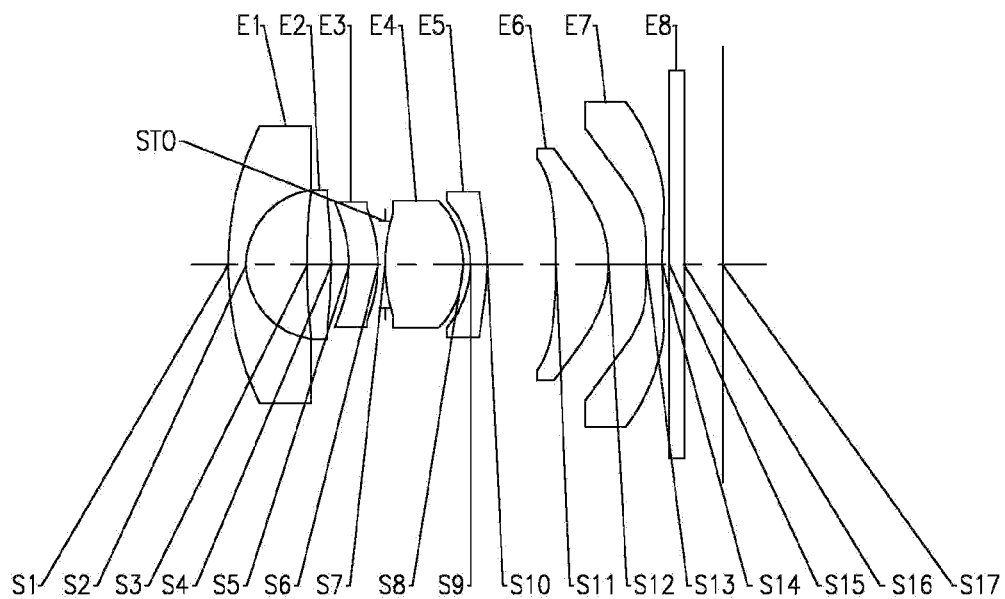
FIG. 13 is a schematic structural diagram illustrating an optical imaging lens assembly according to Example 7 of the present disclosure.

An optical imaging lens assembly according to Example 7 of the present disclosure is described below with reference to FIG. 13 to FIG. 14C. FIG. 13 illustrates a schematic structural diagram of the optical imaging lens assembly according to Example 7 of the present disclosure.

As shown in FIG. 13, the optical imaging lens assembly along an optical axis from an object side to an image side sequentially includes: a first lens E1, a second lens E2, a third lens E3, a diaphragm STO, a fourth lens E4, a fifth lens E5, a sixth lens E6, a seventh lens E7 and an optical filter E8.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has negative refractive power, an object-side surface S5 of the third lens is a concave surface, and an image-side surface S6 of the third lens is a convex surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a convex surface. The sixth lens E6 has positive refractive power, an object-side surface S11 of the sixth lens is a concave surface, and an image-side surface S12 of the sixth lens is a convex surface. The seventh lens E7 has positive refractive power, an object-side surface S13 of the seventh lens is a convex surface, and an image-side surface S14 of the seventh lens is a concave surface. The optical filter E8 has an object-side surface S15 and an image-side surface S16. The optical imaging lens assembly has an imaging plane S17. Light from an object sequentially passes through the respective surfaces S1 to S16 and is finally imaged on the imaging plane S17.

In Example 7, the total effective focal length f of the optical imaging lens assembly is 1.67 mm, and the maximum field-of-view FOV is 134.6°.

Table 13 is a table illustrating basic parameters of the optical imaging lens assembly of Example 7, where the units for the radius of curvature, the thickness and the focal length are millimeter (mm). Table 14 shows high-order coefficients applicable to each aspheric surface in Example 7, where the surface shape of each aspheric surface may be defined by the formula (1) given in the above Example 1.

TABLE 13

| | | | | Material | | | |
|---|---|---|---|---|---|---|---|
| Surface number | Surface type | Radius of curvature | Thickness | Refractive index | Abbe number | Focal length | Conic coefficient |
| OBJ | Spherical | Infinite | Infinite | | | | |
| S1 | Aspheric | 4.9475 | 0.2476 | 1.546 | 56.09 | −2.37 | 0.000 |
| S2 | Aspheric | 1.0071 | 0.8568 | | | | −1.000 |

TABLE 13-continued

| Surface number | Surface type | Radius of curvature | Thickness | Material Refractive index | Abbe number | Focal length | Conic coefficient |
|---|---|---|---|---|---|---|---|
| S3 | Aspheric | 10.7252 | 0.3386 | 1.677 | 19.24 | 6.10 | 0.000 |
| S4 | Aspheric | −6.6233 | 0.2483 | | | | 0.000 |
| S5 | Aspheric | −1.7834 | 0.4052 | 1.546 | 56.09 | −101.04 | 0.000 |
| S6 | Aspheric | −1.9908 | 0.1000 | | | | 0.000 |
| STO | Spherical | Infinite | 0.0000 | | | | |
| S7 | Aspheric | 2.2991 | 1.1004 | 1.546 | 56.09 | 1.67 | 0.000 |
| S8 | Aspheric | −1.2536 | 0.1000 | | | | 0.000 |
| S9 | Aspheric | −1.1569 | 0.2338 | 1.677 | 19.24 | −3.42 | 0.000 |
| S10 | Aspheric | −2.5041 | 0.9648 | | | | 0.000 |
| S11 | Aspheric | −18.1718 | 0.7364 | 1.537 | 55.71 | 4.31 | 0.000 |
| S12 | Aspheric | −2.0795 | 0.5327 | | | | 0.000 |
| S13 | Aspheric | 44.1644 | 0.2200 | 1.537 | 55.71 | 94.51 | 0.000 |
| S14 | Aspheric | 341.5134 | 0.1000 | | | | 0.000 |
| S15 | Spherical | Infinite | 0.2100 | 1.518 | 64.17 | | |
| S16 | Spherical | Infinite | 0.5380 | | | | |
| S17 | Spherical | Infinite | | | | | |

TABLE 14

| Surface number | A4 | A6 | A8 | A10 | A12 | A14 | A16 |
|---|---|---|---|---|---|---|---|
| S1 | 4.3182E−02 | −3.7236E−03 | 3.4145E−04 | −2.1418E−05 | 9.8707E−07 | −2.9873E−08 | 0.0000E+00 |
| S2 | 2.4004E−01 | 6.8395E−02 | 2.4944E−02 | 1.3063E−02 | 7.0568E−03 | 4.1712E−03 | 2.5320E−03 |
| S3 | 7.1021E−03 | 2.4003E−03 | −1.0238E−03 | 3.1701E−04 | −1.4234E−04 | 3.8159E−05 | 1.3042E−05 |
| S4 | 1.5143E−02 | −1.1632E−03 | −1.3618E−04 | 1.9687E−04 | −1.3223E−04 | 3.4453E−05 | 4.4800E−06 |
| S5 | 3.4232E−02 | −2.0082E−03 | 4.5729E−04 | −2.1566E−04 | 2.0736E−05 | 3.6507E−05 | −1.0156E−05 |
| S6 | 1.3852E−02 | −1.8740E−03 | 3.7241E−04 | −2.1563E−04 | 7.6602E−05 | −2.7010E−06 | 2.5982E−06 |
| S7 | 9.3802E−04 | −1.0849E−03 | −8.0840E−05 | 2.6187E−05 | −4.2650E−05 | 2.9695E−05 | −2.1140E−05 |
| S8 | 3.4434E−02 | −1.2332E−02 | 2.8475E−03 | 1.4475E−06 | 1.3680E−04 | −1.0697E−04 | −3.6964E−06 |
| S9 | 9.4109E−02 | −1.8691E−02 | 6.5540E−03 | 2.0181E−04 | 3.1535E−04 | −9.7974E−05 | −4.2211E−05 |
| S10 | 1.1492E−01 | −1.3801E−02 | 5.0866E−03 | −5.4204E−04 | 1.6480E−04 | −2.3269E−05 | −1.5854E−05 |
| S11 | −2.0400E−01 | −4.3580E−03 | −9.3085E−03 | 3.8138E−03 | −1.7969E−03 | 8.2151E−04 | −4.1080E−04 |
| S12 | −6.3576E−02 | 9.9460E−02 | −2.1405E−02 | 1.2663E−02 | −4.2611E−03 | 1.3539E−03 | −9.5630E−04 |
| S13 | −1.1456E+00 | 3.2196E−01 | −8.7877E−02 | 1.8133E−02 | −1.7900E−03 | 2.3031E−04 | −9.0467E−04 |
| S14 | −5.3677E−01 | 6.3985E−03 | 3.3043E−02 | −3.4981E−02 | 2.1985E−02 | −1.1112E−02 | 5.0492E−03 |

| Surface number | A18 | A20 | A22 | A24 | A26 | A28 | A30 |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | 1.5672E−03 | 9.7627E−04 | 6.0410E−04 | 3.6693E−04 | 2.1352E−04 | 1.1753E−04 | 4.8313E−05 |
| S3 | 3.9295E−06 | −9.7144E−06 | 2.7500E−06 | −1.6180E−07 | 0.0000E+00 | 0.0000E+00 | 0.0000E+00 |
| S4 | −6.1411E−06 | 1.7066E−06 | −1.5439E−07 | 0.0000E+00 | 0.0000E+00 | 0.0000E+00 | 0.0000E+00 |
| S5 | −9.9575E−07 | 5.9962E−08 | 8.4509E−08 | 0.0000E+00 | 0.0000E+00 | 0.0000E+00 | 0.0000E+00 |
| S6 | −9.4672E−06 | 9.4957E−06 | −5.3847E−06 | 1.4794E−06 | −1.3995E−07 | 0.0000E+00 | 0.0000E+00 |
| S7 | 2.3500E−05 | −1.0184E−05 | 9.7804E−06 | −5.4522E−06 | 0.0000E+00 | 0.0000E+00 | 0.0000E+00 |
| S8 | 2.4040E−05 | 3.5741E−06 | −5.6369E−06 | 1.4132E−06 | 0.0000E+00 | 0.0000E+00 | 0.0000E+00 |
| S9 | 3.8355E−05 | 6.6941E−06 | −1.2563E−05 | −5.0781E−06 | 0.0000E+00 | 0.0000E+00 | 0.0000E+00 |
| S10 | 1.7728E−05 | 3.5045E−06 | −6.3177E−06 | −1.2054E−06 | 0.0000E+00 | 0.0000E+00 | 0.0000E+00 |
| S11 | 3.0794E−04 | −1.0105E−04 | 3.6417E−05 | −4.3709E−05 | −7.6129E−07 | 0.0000E+00 | 0.0000E+00 |
| S12 | 2.6303E−04 | 2.0310E−05 | −1.3197E−05 | 0.0000E+00 | 0.0000E+00 | 0.0000E+00 | 0.0000E+00 |
| S13 | 1.0384E−03 | −7.7600E−04 | 1.7354E−04 | −6.8616E−05 | −6.6277E−06 | −1.0075E−06 | −1.5257E−07 |
| S14 | −1.6605E−03 | 3.1251E−04 | −2.6525E−05 | 4.6511E−07 | 0.0000E+00 | 0.0000E+00 | 0.0000E+00 |

Figure 14A:
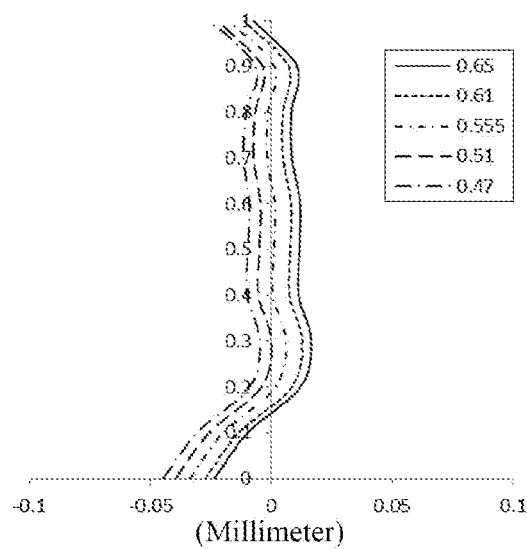
FIGS. 14A-14C respectively illustrate a longitudinal aberration curve, an astigmatic curve and a distortion curve of the optical imaging lens assembly according to Example 7.
Figure 14B:
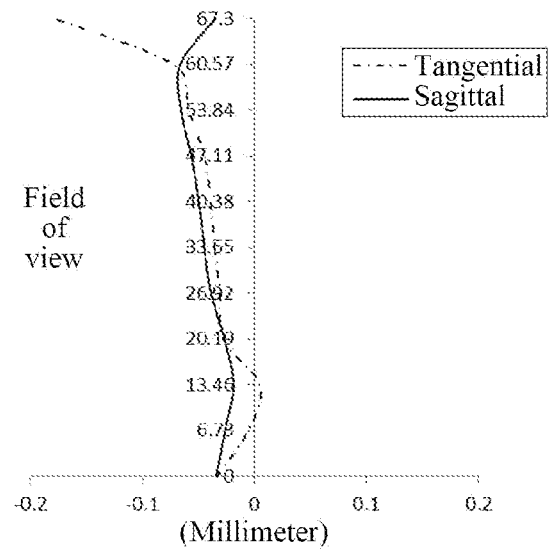
Figure 14C:
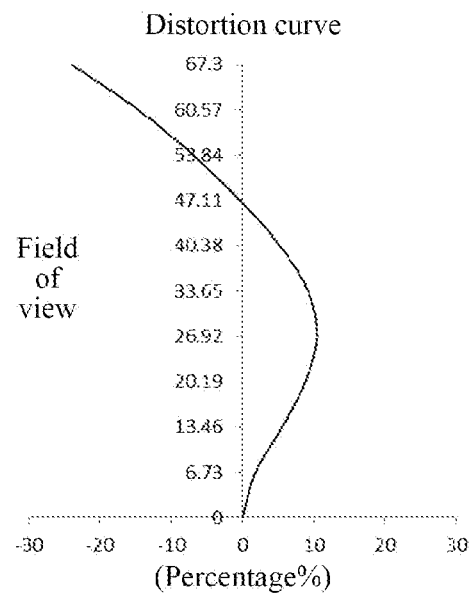

FIG. 14A illustrates the longitudinal aberration curve of the optical imaging lens assembly according to Example 7, representing deviations of focal points converged by light of different wavelengths after passing through the lens assembly. FIG. 14B illustrates the astigmatic curve of the optical imaging lens assembly according to Example 7, representing a curvature of a tangential plane and a curvature of a sagittal plane. FIG. 14C illustrates the distortion curve of the optical imaging lens assembly according to Example 7, representing the amounts of distortion corresponding to different field-of-views. It can be seen from FIG. 14A to FIG. 14C that the optical imaging lens assembly provided in Example 7 can achieve good imaging quality.

Example 8

Figure 15:
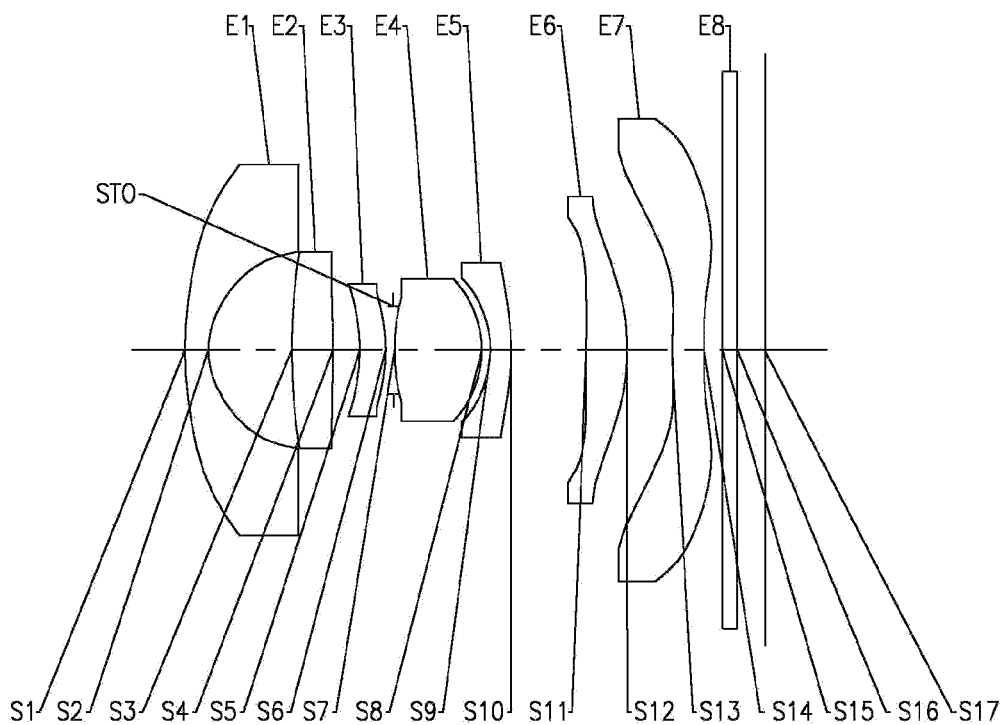
FIG. 15 is a schematic structural diagram illustrating an optical imaging lens assembly according to Example 8 of the present disclosure.

An optical imaging lens assembly according to Example 8 of the present disclosure is described below with reference to FIG. 15 to FIG. 16C. FIG. 15 illustrates a schematic structural diagram of the optical imaging lens assembly according to Example 8 of the present disclosure.

As shown in FIG. 15, the optical imaging lens assembly along an optical axis from an object side to an image side sequentially includes: a first lens E1, a second lens E2, a third lens E3, a diaphragm STO, a fourth lens E4, a fifth lens E5, a sixth lens E6, a seventh lens E7 and an optical filter E8.

The first lens E2 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has positive refractive power, an object-side surface S5 of the third lens is a concave surface, and an image-side surface S6 of the third lens is a convex surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a convex surface. The sixth lens E6 has positive refractive power, an object-side surface S22 of the sixth lens is a convex surface, and an image-side surface S12 of the sixth lens is a convex surface. The seventh lens E7 has positive refractive power, an object-side surface S13 of the seventh lens is a convex surface, and an image-side surface S14 of the seventh lens is a convex surface. The optical filter E8 has an object-side surface S15 and an image-side surface S16. The optical imaging lens assembly has an imaging plane S17. Light from an object sequentially passes through the respective surfaces S1 to S16 and is finally imaged on the imaging plane S17.

In Example 8, the total effective focal length f of the optical imaging lens assembly is 1.66 mm, and the maximum field-of-view FOV is 133.3°.

Table 15 is a table illustrating basic parameters of the optical imaging lens assembly of Example 8, where the units for the radius of curvature, the thickness and the focal length are millimeter (mm). Table 16 shows high-order coefficients applicable to each aspheric surface in Example 8, where the surface shape of each aspheric surface may be defined by the formula (1) given in the above Example 1.

TABLE 15

| Surface number | Surface type | Radius of curvature | Thickness | Refractive index | Abbe number | Focal length | Conic coefficient |
|---|---|---|---|---|---|---|---|
| OBJ | Spherical | Infinite | Infinite | | | | |
| S1 | Aspheric | 5.0241 | 0.3267 | 1.546 | 55.97 | −2.61 | 0.000 |
| S2 | Aspheric | 1.0861 | 1.1710 | | | | 0.000 |
| S3 | Aspheric | 7.5754 | 0.5784 | 1.666 | 20.32 | 6.93 | 0.000 |
| S4 | Aspheric | −11.4705 | 0.3776 | | | | 0.000 |
| S5 | Aspheric | −2.3096 | 0.3601 | 1.546 | 55.97 | 30.45 | 0.000 |
| S6 | Aspheric | −2.1395 | 0.1092 | | | | 0.000 |
| STO | Spherical | Infinite | 0.0171 | | | | |
| S7 | Aspheric | 3.3922 | 1.2257 | 1.546 | 55.97 | 1.88 | 0.000 |
| S8 | Aspheric | −1.2795 | 0.1208 | | | | 0.000 |
| S9 | Aspheric | −1.2896 | 0.2892 | 1.677 | 19.24 | −3.16 | 0.000 |
| S10 | Aspheric | −3.5385 | 1.0526 | | | | 0.000 |
| S11 | Aspheric | 7.9410 | 0.5739 | 1.546 | 55.97 | 7.04 | 0.000 |
| S12 | Aspheric | −7.2606 | 0.6307 | | | | 0.000 |
| S13 | Aspheric | 4.1193 | 0.4500 | 1.619 | 25.56 | 5.81 | 0.000 |
| S14 | Aspheric | −27.0110 | 0.2566 | | | | 0.000 |
| S15 | Spherical | Infinite | 0.2100 | 1.518 | 64.17 | | |
| S16 | Spherical | Infinite | 0.3847 | | | | |
| S17 | Spherical | Infinite | | | | | |

TABLE 16

| Surface number | A4 | A6 | A8 | A10 | A12 | A14 | A16 |
|---|---|---|---|---|---|---|---|
| S1 | −4.6079E−03 | 6.0742E−02 | −2.0502E−02 | 3.4890E−03 | −3.6224E−04 | 2.4571E−05 | −1.1295E−06 |
| S2 | 1.6180E−01 | 1.2578E−01 | 3.6034E−02 | 2.2961E−02 | 1.0500E−02 | 8.1119E−03 | 4.3295E−03 |
| S3 | −2.4292E−02 | 7.8013E−03 | −1.5600E−03 | 7.2955E−04 | −3.7844E−04 | −3.6755E−05 | 2.2935E−05 |
| S4 | 4.2902E−02 | −2.9701E−03 | −2.1052E−04 | 2.4055E−04 | −2.4524E−04 | 8.9313E−05 | 1.7093E−06 |
| S5 | 4.4274E−02 | −7.3936E−03 | 1.4595E−03 | −1.8364E−04 | 7.6511E−05 | −7.4876E−07 | −1.0042E−05 |
| S6 | 4.0094E−02 | −6.5247E−03 | 1.5478E−03 | −3.0907E−04 | 1.1044E−04 | −3.0456E−05 | −1.6594E−06 |
| S7 | 1.8384E−02 | −3.2944E−03 | 6.8957E−04 | −1.6846E−04 | 3.4630E−05 | −1.5979E−05 | −2.9771E−06 |
| S8 | 8.6038E−02 | −1.0187E−02 | 2.1495E−03 | 5.3086E−05 | −1.7350E−04 | 5.9060E−05 | 5.9531E−05 |
| S9 | 9.4451E−02 | −1.5386E−02 | 1.9715E−03 | 1.9087E−04 | −1.1691E−04 | 1.4956E−04 | 6.0820E−05 |
| S10 | 7.8008E−02 | −3.0807E−03 | 1.2624E−03 | 2.7200E−05 | 1.0150E−05 | 9.5037E−05 | −3.0845E−05 |
| S11 | −5.0625E−01 | 3.4926E−02 | −2.7867E−02 | 1.1790E−02 | −8.5395E−03 | 3.7396E−03 | −2.8169E−03 |
| S12 | −2.9535E−01 | 1.8474E−01 | −6.0016E−02 | 3.0856E−02 | −2.0877E−02 | 8.7838E−03 | −5.2317E−03 |
| S13 | −2.3197E+00 | 6.0923E−01 | −1.7716E−01 | 6.1693E−02 | −2.2187E−02 | 6.2846E−03 | −4.7388E−03 |
| S14 | −2.8155E−01 | −2.5823E−01 | 1.2646E−01 | −1.1474E−01 | 5.9259E−02 | −2.9171E−02 | 1.7556E−02 |

| Surface number | A18 | A20 | A22 | A24 | A26 | A28 | A30 |
|---|---|---|---|---|---|---|---|
| S1 | 3.4224E−08 | 0.0000E+00 | 0.0000E+00 | 0.0000E+00 | 0.0000E+00 | 0.0000E+00 | 0.0000E+00 |
| S2 | 3.3558E−03 | 1.8124E−03 | 1.3045E−03 | 7.4957E−04 | 4.3184E−04 | 2.2297E−04 | 5.5168E−05 |
| S3 | 1.4366E−05 | 7.3970E−06 | −9.9850E−06 | 3.1528E−06 | −4.1485E−07 | 1.9567E−08 | 0.0000E+00 |
| S4 | 1.5097E−05 | −8.5534E−06 | 2.2627E−07 | −1.5358E−06 | 1.0618E−06 | −1.6241E−07 | 0.0000E+00 |
| S5 | −4.5259E−06 | 4.1178E−06 | −9.6760E−07 | 8.4997E−08 | 0.0000E+00 | 0.0000E+00 | 0.0000E+00 |
| S6 | −2.9591E−06 | 3.7862E−06 | −1.2060E−06 | 1.5664E−07 | −6.7680E−09 | 0.0000E+00 | 0.0000E+00 |
| S7 | −1.6307E−06 | 1.1900E−06 | 1.9577E−06 | −1.2697E−06 | 2.5908E−07 | −1.6927E−08 | 0.0000E+00 |

TABLE 16-continued

| | | | | | | | |
|---|---|---|---|---|---|---|---|
| S8  | 1.4248E−06 | −2.4003E−05 | 2.5673E−06  | 3.6567E−06  | −1.0965E−06 | 6.2902E−08  | 0.0000E+00 |
| S9  | 5.2736E−05 | −3.9644E−05 | −6.8816E−06 | −7.0402E−06 | 7.3379E−06  | −9.2720E−07 | 0.0000E+00 |
| S10 | 1.8024E−05 | −3.1557E−05 | −6.0823E−06 | −1.0197E−05 | 1.9855E−06  | 4.2553E−06  | 0.0000E+00 |
| S11 | 2.6681E−04 | −1.1857E−03 | −1.1913E−04 | −5.3657E−04 | −7.6259E−05 | −2.0515E−04 | −1.7235E−06 |
| S12 | 1.4024E−03 | −4.7478E−04 | 3.8021E−04  | 1.9980E−05  | 3.1112E−06  | 3.9400E−07  | 0.0000E+00 |
| S13 | 3.0063E−03 | −2.3234E−03 | 2.1203E−03  | −7.1919E−04 | −2.5032E−05 | −2.6898E−07 | −6.1303E−08 |
| S14 | −8.8030E−03 | 2.8805E−03 | −1.1449E−03 | 8.9314E−04  | −3.4363E−04 | 3.6097E−05  | 1.6455E−06 |

Figure 16A:
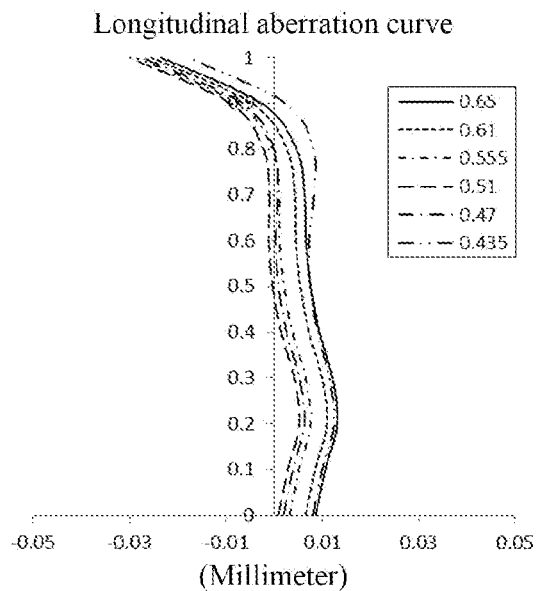
FIGS. 16A-16C respectively illustrate a longitudinal aberration curve, an astigmatic curve and a distortion curve of the optical imaging lens assembly according to Example 8.
Figure 16B:
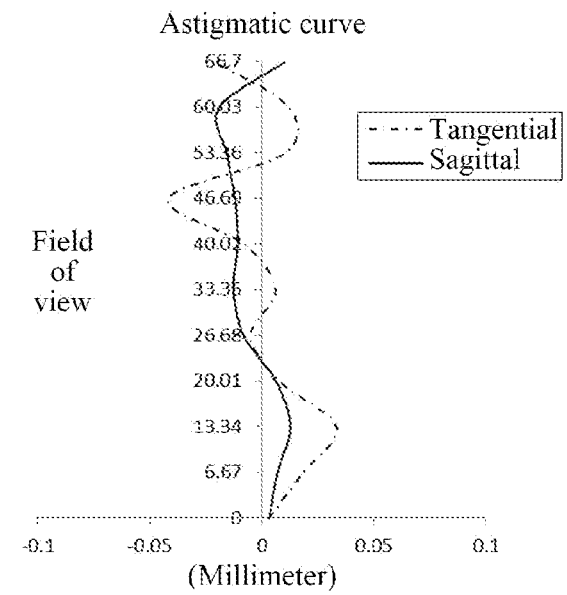
Figure 16C:
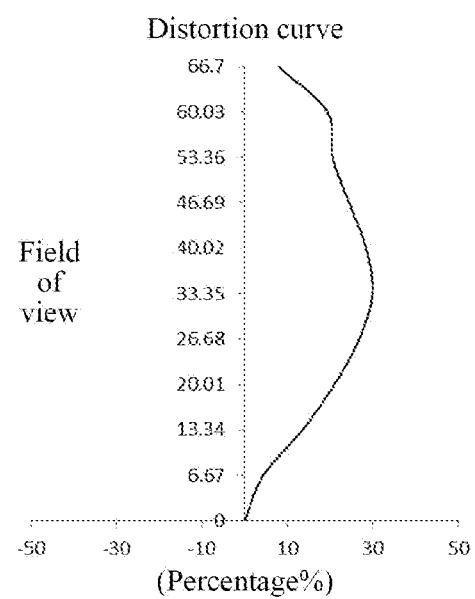

FIG. 16A illustrates the longitudinal aberration curve of the optical imaging lens assembly according to Example 8, representing deviations of focal points converged by light of different wavelengths after passing through the lens assembly. FIG. 16B illustrates the astigmatic curve of the optical imaging lens assembly according to Example 8, representing a curvature of a tangential plane and a curvature of a sagittal plane. FIG. 16C illustrates the distortion curve of the optical imaging lens assembly according to Example 8, representing the amounts of distortion corresponding to different field-of-views. It can be seen from FIG. 16A to FIG. 16C that the optical imaging lens assembly provided in Example 8 can achieve good imaging quality.

In view of the above, examples 1 to 8 respectively satisfy the relationship shown in Table 17.

TABLE 17

| Conditional | Example | | | | | | | |
|---|---|---|---|---|---|---|---|---|
| | 1 | 2 | 3 | 4 | 5 | 6 | 7 | 8 |
| tan(FOV/3) | 1.00 | 0.97 | 1.00 | 0.98 | 0.99 | 0.98 | 1.00 | 0.98 |
| f/R9 + f/R10 | −2.10 | −1.78 | −2.15 | −2.10 | −2.10 | −1.74 | −2.11 | −1.76 |
| f/R5 + f/R6 | −1.76 | −1.52 | −1.80 | −1.81 | −1.77 | −1.47 | −1.77 | −1.50 |
| f/f7 | 0.02 | 0.27 | 0.06 | −0.02 | 0.07 | 0.30 | 0.02 | 0.29 |
| f2/f4 | 3.67 | 3.69 | 3.65 | 3.91 | 3.61 | 3.72 | 3.65 | 3.69 |
| f6/f4 | 2.54 | 3.78 | 2.78 | 3.77 | 2.79 | 3.70 | 2.58 | 3.75 |
| f1/T12 | −2.76 | −2.24 | −2.83 | −2.74 | −2.83 | −2.24 | −2.76 | −2.23 |
| T56/T67 | 1.84 | 1.68 | 1.80 | 1.73 | 1.80 | 1.64 | 1.81 | 1.67 |
| R1/R2 | 4.91 | 4.58 | 4.78 | 4.92 | 4.80 | 4.62 | 4.91 | 4.63 |
| |R3 + R4|/(R3 − R4) | 0.23 | 0.20 | 0.19 | 0.09 | 0.20 | 0.23 | 0.24 | 0.20 |
| (R7 + R8)/CT4 | 0.96 | 1.72 | 0.98 | 1.38 | 1.01 | 1.73 | 0.95 | 1.72 |
| f/|f3| | 0.02 | 0.06 | 0.02 | 0.06 | 0.01 | 0.05 | 0.02 | 0.05 |
| f5/f45 | −1.19 | −0.82 | −1.16 | −1.10 | −1.15 | −0.84 | −1.20 | −0.82 |
| DT11/DTs | 3.21 | 4.17 | 3.25 | 3.47 | 3.30 | 4.24 | 3.19 | 4.22 |
| DTs/ImgH | 0.20 | 0.15 | 0.19 | 0.17 | 0.19 | 0.15 | 0.20 | 0.15 |

The present disclosure further provides an imaging apparatus, having an electronic photosensitive element, which may be a photosensitive Charge-Coupled Device (CCD) or a Complementary Metal-Oxide Semiconductor (CMOS). The imaging apparatus may be an independent imaging apparatus such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, along an optical axis from an object side to an image side sequentially comprising:
a first lens having negative refractive power;
a second lens having positive refractive power;
a third lens;
a fourth lens having positive refractive power;
a fifth lens having negative refractive power;
a sixth lens having positive refractive power; and
a seventh lens;
wherein, a maximum field-of-view FOV of the optical imaging lens assembly satisfies: tan (FOV/3)≥0.9;
a total effective focal length f of the optical imaging lens assembly, a radius of curvature R9 of an object-side surface of the fifth lens, and a radius of curvature R10 of an image-side surface of the fifth lens satisfy: −3.0<(f/R9)+(f/R10)<−1.5; and
the total effective focal length f of the optical imaging lens assembly, a radius of curvature R5 of an object-side surface of the third lens, and a radius of curvature R6 of an image-side surface of the third lens satisfy: −2.0<(f/R5)+(f/R6)≤−1.4.

2. The optical imaging lens assembly according to claim 1, wherein the total effective focal length f of the optical imaging lens assembly and an effective focal length f7 of the seventh lens satisfy: −0.1<f/f7<0.5.

3. The optical imaging lens assembly according to claim 1, wherein an effective focal length f2 of the second lens and an effective focal length f4 of the fourth lens satisfy: 3.5<f2/f4<4.0.

4. The optical imaging lens assembly according to claim 1, wherein an effective focal length f6 of the sixth lens and an effective focal length f4 of the fourth lens satisfy: 2.0<f6/f4<4.0.

5. The optical imaging lens assembly according to claim 1, wherein an effective focal length f1 of the first lens and a spaced interval T12 between the first lens and the second lens on the optical axis satisfy: —3.0<f1/T12<−2.0.

6. The optical imaging lens assembly according to claim 1, wherein a spaced interval T56 between the fifth lens and the sixth lens on the optical axis and a spaced interval T67 between the sixth lens and the seventh lens on the optical axis satisfy: 1.5<T56/T67<2.0.

7. The optical imaging lens assembly according to claim 1, wherein a radius of curvature R1 of an object-side surface of the first lens and a radius of curvature R2 of an image-side surface of the first lens satisfy: 4.0<R1/R2<5.0.

8. The optical imaging lens assembly according to claim 1, wherein a radius of curvature R4 of an image-side surface of the second lens and a radius of curvature R3 of an object-side surface of the second lens satisfy: 0<|R3+R4|/(R3-R4)<0.3.

9. The optical imaging lens assembly according to claim 1, wherein a radius of curvature R7 of an object-side surface of the fourth lens, a radius of curvature R8 of an image-side surface of the fourth lens, and a center thickness CT4 of the fourth lens on the optical axis satisfy: 0.9<(R7+R8)/CT4<2.0.

10. The optical imaging lens assembly according to claim 1, wherein the total effective focal length f of the optical imaging lens assembly and an effective focal length f3 of the third lens satisfy: f/|f3|<0.1.

11. The optical imaging lens assembly according to claim 1, wherein an effective focal length f5 of the fifth lens and a combined focal length f45 of the fourth lens and the fifth lens satisfy: −1.2≤f5/f45<−0.5.

12. The optical imaging lens assembly according to claim 1, wherein the optical imaging lens assembly further comprises a diaphragm, and a maximum effective radius DT11 of the object-side surface of the first lens and a maximum effective radius DTs of the diaphragm satisfy: 3.0<DT11/DTs<4.5.

13. The optical imaging lens assembly according to claim 1, wherein the optical imaging lens assembly further comprises a diaphragm, and a maximum effective radius DTs of the diaphragm and half of a diagonal length ImgH of an effective pixel area on an imaging plane of the optical imaging lens assembly satisfy: 0<DTs/ImgH≤0.2.

14. An optical imaging lens assembly, along an optical axis from an object side to an image side sequentially comprising:
a first lens having negative refractive power;
a second lens having positive refractive power;
a third lens;
a fourth lens having positive refractive power;
a fifth lens having negative refractive power;
a sixth lens having positive refractive power; and
a seventh lens;
wherein, a maximum field-of-view FOV of the optical imaging lens assembly satisfies: tan (FOV/3)≥0.9;
an effective focal length f1 of the first lens and a spaced interval T12 between the first lens and the second lens on the optical axis satisfy: −3.0<f1/T12<−2.0; and
a total effective focal length f of the optical imaging lens assembly, a radius of curvature R5 of an object-side surface of the third lens, and a radius of curvature R6 of an image-side surface of the third lens satisfy: −2.0<(f/R5)+(f/R6)≤−1.4.

15. The optical imaging lens assembly according to claim 14, wherein the total effective focal length f of the optical imaging lens assembly and an effective focal length f7 of the seventh lens satisfy: −0.1<f/f7<0.5.

16. The optical imaging lens assembly according to claim 14, wherein an effective focal length f2 of the second lens and an effective focal length f4 of the fourth lens satisfy: 3.5<f2/f4<4.0.

17. The optical imaging lens assembly according to claim 14, wherein an effective focal length f6 of the sixth lens and an effective focal length f4 of the fourth lens satisfy: 2.0<f6/f4<4.0.

18. The optical imaging lens assembly according to claim 14, wherein a spaced interval T56 between the fifth lens and the sixth lens on the optical axis and a spaced interval T67 between the sixth lens and the seventh lens on the optical axis satisfy: 1.5<T56/T67<2.0.

* * * * *